United States Patent [19]
Ohtomo et al.

[11] Patent Number: 5,822,294
[45] Date of Patent: Oct. 13, 1998

[54] OPTICAL RECORDING MEDIUM HAVING A SPECIFIED RANGE OF PIT WIDTHS AND PIT DEPTHS

[75] Inventors: Katsuhiko Ohtomo; Masaki Kagawa; Hiroshi Nomura; Hiroyuki Takemoto, all of Miyagi, Japan

[73] Assignee: Sony Corporation, Tokyo, Japan

[21] Appl. No.: 811,773

[22] Filed: Mar. 6, 1997

[30] Foreign Application Priority Data

Mar. 15, 1996 [JP] Japan .................................. 8-059612

[51] Int. Cl.⁶ ...................................................... G11B 7/24
[52] U.S. Cl. ...................................... 369/275.4; 369/275.1
[58] Field of Search ............................. 369/275.4, 275.3, 369/275.1, 275.2, 109, 272, 273, 277, 278, 279

[56] References Cited

U.S. PATENT DOCUMENTS

| | | | |
|---|---|---|---|
| 5,477,527 | 12/1995 | Tsuchiya et al. | 369/275.4 |
| 5,517,486 | 5/1996 | Haneda | 369/275.4 |
| 5,602,825 | 2/1997 | Sugaya et al. | 369/275.4 |
| 5,617,406 | 4/1997 | Onagi et al. | 369/275.3 |
| 5,666,345 | 9/1997 | Takahashi et al. | 369/275.4 |

*Primary Examiner*—Tan Dinh
*Attorney, Agent, or Firm*—Limbach & Limbach L.L.P.

[57] ABSTRACT

An optical recording medium capable of being reproduced by a conventional drive device which meets an optical disk having grooves and no groove in an area in which pits are formed. In the optical recording medium having pits 1 showing information signals in the shape of protruding and recessed parts, it is assumed that the depth t1 of the above mentioned pits t2 of the pits 1 is located within a range of 0.3 to 0.6 μm. Herein, n designates the refractive index of the base of the optical recording medium and designates the wavelength of the light used for reproduction.

15 Claims, 22 Drawing Sheets

OPTICAL RECORDING MEDIUM HAVING A SPECIFIED RANGE OF PIT WIDTHS AND PIT DEPTHS

BACKGROUND OF THE INVENTION

The present invention relates to an optical recording medium on which pits, showing information signals in the form of protruding and recessed parts, are previously formed in a part of an area exclusive for reproduction or a recording area or the like in which the information signals can be written.

Recently, studies concerning an optical information recording system, in which the information signals are written on a recording medium by using light and the information signals are read out from the recording medium by using light, have been promoted in various places, in the field of information recording. The optical information recording system has a variety of advantages as described below. For example, the optical information recording system can perform recording and reproducing operations without making contact with the medium. Further, the optical recording system can achieve a recording density significantly higher than that of a magnetic recording system. Still further, the optical information recording system can readily meet various recording forms including a type exclusive for reproduction, a postscript type, a rewritable type and so on. In addition, the optical information recording system can realize a recording of large capacity at low cost. Therefore, the optical information recording system has been widely employed in the field of information recording.

The optical recording medium used for such an optical information recording system is usually formed in the shape of a disk and spiral or concentric tracks are formed on its main surface. Such a disk shaped optical recording medium is generally called an optical disk.

The above mentioned optical disk is exclusive for reproduction of previously written information signals. The postscript of the information signals cannot be made, nor can the information signals be rewritten. This optical disk exclusive for reproduction usually has, as illustrated in FIG. 1, only pits 101 showing the information signals formed in the shapes of protruding and recessed parts on the surface of the disk. Herein, the pits 101 are formed in accordance with an embossing finish or the like. In such an optical disk, while a tracking control is performed by detecting the light reflected and diffracted by the pits 101, the information signals are reproduced. The optical disk exclusive for reproduction having a surface on which only pits 101 embodying the information signals in the form of protruding and recessed parts are formed is easily manufactured and excellent in its productivity, since its structure is simple. Examples of, such an optical disk are a compact disk (CD) which is a digital audio disk on which music information or the like is recorded and a laser disk (LD) which is a digital video disk on which image information or the like is recorded.

Further, another optical disk is also a disk on which the information signals can be additionally recorded or rewritten such as a photo electromagnetic disk on which the information signals can be additionally recorded or rewritten by a photo electromagnetic recording system or a phase change type optical disk on which the information signals are additionally recorded or rewritten by using the phase change of a medium. Since, in the above described optical disk, pits which indicate the information signals in the forms of protruding and recessed parts are not generally formed in a part where the information signals are to be written, a tracking control cannot be carried out by detecting the light reflected and diffracted by the pits showing the information signals in the forms of protruding and recessed parts. Thus, in the case of the above mentioned optical disk, grooves 102 which are guide grooves 102 for a tracking control are previously formed successively along tracks, as seen in FIG. 2. Then, the tracking control is performed by detecting the light reflected and diffracted by these grooves 102, during recording and reproducing of the information signals. At this time, the information signals are written in lands 103 which are spaces between the grooves 102.

The optical disk provided with the grooves 102 as mentioned above similarly needs the optical disk exclusive for reproduction. Then, when the optical disk for reproduction on which the grooves 102 are formed is manufactured, the pits 101 indicating the information signals in the shapes of protruding and recessed parts, namely, the irregularities, have been conventionally formed in the lands 103 between the grooves 102, as shown in FIG. 3. However, since the above described optical disk needs to form both the pits 101 and grooves 102, the structure has been more complicated and minute than that of the optical disk only provided with the pits 101 or the optical disk only having the grooves 102 formed. Therefore, it has been extremely difficult to manufacture such an optical disk.

Briefly stated, since the depth of the pits 101 is different from that of the grooves 102 in the optical disk provided with both the pits 101 and the grooves 102, it has been necessary to form protruding and recessed parts having different heights in a stamper, when a metal plate for forming a base, which is called a stamper is manufactured. However, it has been very difficult to form the protruding and recessed parts with different heights when the stamper is manufactured, and therefore, the yield of the stamper has been inconveniently low.

Further stated, in the optical disk having both the pits 101 and the grooves 102, it has been more difficult to form the base using the stamper than in a case where the optical disk has only the pits 101 or the grooves 102. FIG. 4 shows a sectional view of a stamper used for manufacturing the base of the optical disk having only the pits 101, that is, the stamper for the optical disk exclusive for reproduction. Further, FIG. 5 shows a sectional view of a stamper used for manufacturing the base of the optical disk having only the grooves 102, that is, the stamper for the optical recording disk. Further, FIG. 6 illustrates a sectional view of a stamper used for manufacturing the base of the optical disk having both the pits 101 and the grooves 102, that is, the stamper used for manufacturing the base of the optical recording disk as one exclusive for reproduction. In FIGS. 4 to 6, arrows A represent places to which a resin which is a base material flows, when the base is manufactured. As illustrated in FIG. 4, the base of the optical disk having only the pits 101 is formed by making the resin flow into the stamper which is provided with only protruding parts 101a corresponding to the pits 101. Further, as illustrated in FIG. 5, the base of the optical disk having only the grooves 102 is formed by making a resin flow into a stamper in which only protruding parts 102a corresponding to the grooves 102 are formed. On the other hand, as seen in FIG. 6, the base of the optical disk having both the pits 101 and the grooves 102 is manufactured by making a resin flow into a stamper in which both protruding parts 101a corresponding to the pits 101 and protruding parts 102a corresponding to the grooves 102 are formed. Therefore, an area in which the resin flows in the stamper is greatly reduced. Therefore, it becomes more extraordinarily difficult to manufacture the base of the optical disk having both the pits 101 and the grooves 102 than a case where the optical disk having only the pits 101 or the optical disk having only the grooves 102 is manufactured.

As described above, since the optical disk exclusive for reproduction which meets the standard of the optical disk on which the grooves 102 are formed has been manufactured with difficulty, a manufacturing cost has been raised. Therefore, the practical use of this optical disk has not been greatly promoted.

A standard concerning the tracking control of the optical disk ordinarily specifies that a signal required for the tracking control is obtained at a sufficient level. The optical disk as mentioned above does not always require the existence of the grooves 102 as essential components. Thus, in order to manufacture the above mentioned optical disk as one exclusive for reproduction, it may be possibly considered to remove the grooves 102 and form only the pits 101. If this can be realized, the optical disk will be easily manufactured and a manufacturing cost can be remarkably lowered.

However, there has been encountered a problem that the tracking control cannot be normally carried out when the grooves 102 are simply removed from the optical disk on which the grooves 102 are supposed to be formed. This problem will be described hereinafter.

The tracking control of the optical disk ordinarily employs a push-pull signal PP as a signal for detecting a tracking error and uses a cross-tracking signal as a signal for detecting what number of tracks a light spot traverses when the light spot moves.

The light reflected and diffracted by the pits 101 and the grooves 102 is received by two light receiving parts 111 and 112 on a two-piece light quantity detector 110 which is symmetrically arranged with respect to the center of a track, as shown in FIG. 7, and a push-pull signal PP is taken out as an output difference therebetween. At this time, the distribution of the reflected and diffracted light changes in accordance with the light spot relative to the track and the output difference in the two light receiving parts 111 and 112 represents the light distribution. Accordingly, the positional error of the light spot, that is, a tracking error is detected based on the push-pull signal PP.

On the other hand, a cross-track signal CTS usually employs the sum signal of signals output from the above mentioned two light receiving parts 111 and 112. The cross-track signal CTS is taken out as the quantity of return light when the light spot is moved perpendicularly or slantwise with respect to the direction of a track. The number of tracks the light spot traverses when the light spot moves is counted during a seek operation of the light spot in accordance with the cross-track signal CTS, so that the quantity of movement of the light spot or its moving speed is detected.

Then, the optical disk on which the grooves 102 are formed generates the push-pull signal PP and the cross-track signal CTS from the light reflected and diffracted from the grooves 102. Herein, when it is assumed that the wavelength of the light used for recording and reproduction of the information signals is $\lambda$, and the refractive index of the base is n, the above mentioned push-pull signal PP can obtain a maximum output when the depth of the grooves 102 is approximately $\lambda/(8n)$. The above mentioned cross-track signal CTS can obtain a maximum output when the depth of the grooves 102 is approximately $\lambda/(4n)$. Thus, it is usually assumed that the depth of the grooves 102 of the optical disk is about $\lambda/(7n)$ so as to detect both the push-pull signal PP and the cross-track signal CTS at high level.

Further, it is assumed that, when the optical disk has both the pits 101 and the grooves 102, the depth of the pits 101 is different from that of the grooves 102, in order to separate the signals from the pits 101, from the signals from the grooves 102. In this case, it should be noted that the depth of the pits 101 needs to be set so as to obtain a large reproducing signal output. Thus, when the optical disk is provided with both the pits 101 and the grooves 102, it is usually assumed that the depth of the pits 101 is about $\lambda/(4n)$, by taking the above described things into consideration.

On the other hand, since the optical disk exclusive for reproduction on which only the pits 101 are formed must produce not only the reproducing signal but also the push-pull signal PP and the cross-track signal CTS, from the light reflected and diffracted by the pits 101, the depth of the pits 101 is usually set approximately to $\lambda/(5n)$, so that the respective signals can be detected at high level.

The relation between the position of the light spot and the push-pull signals PP in such an optical disk will be illustrated in FIGS. 8 and 9. Herein, FIG. 8 illustrates an example in which the push-pull signal PP is generated by the grooves 102 in the optical disk provided with the pits 101 and the grooves 102. Further, FIG. 9 shows an example in which the push-pull signal PP is generated by the pits 101 in the optical disk having only the pits 101 formed. As can be seen in FIGS. 8 and 9, the push-pull signal PP produced by the optical disk having the grooves 102 formed and the push-pull signal PP generated by the optical disk having only the pits 101 are inverted in their polarities.

More specifically, in the example illustrated in FIG. 8, when the light spot shifts leftward, the push-pull signal PP becomes minus, and when the light spot shifts rightward, the push-pull signal PP becomes plus. On the contrary, in the example illustrated in FIG. 9, when the light spot shifts leftward, the push-pull signal becomes plus, and when the light spot shift rightward, the push-pull signal PP becomes minus. Therefore, when the information signals of the optical disk on which only the pits 101 are formed are reproduced by a drive device which meets the optical disk on which the grooves 102 are formed, the tracking control cannot be normally carried out. Thus, when an optical pickup is to be moved leftward, a servomechanism undesirably operates to move the optical pickup rightward. When the optical pickup is to be moved rightward, the servomechanism undesirably operates to move the optical pickup leftward.

As can be understood from the above explanation, if the grooves 102 are simply removed from the optical disk on which the grooves 102 are supposed to be formed, the polarity of the push-pull signal will be inconveniently inverted. Therefore, the tracking control cannot be normally performed, and the information signals of the above described optical disk having no grooves cannot be reproduced by the drive device which meets the optical disk on which the grooves 102 are formed. Accordingly, when a compatibility with the conventional drive device which meets the optical disk on which the grooves 102 are formed is taken into account, the grooves 102 must not have been simply removed from the optical disk on which the grooves 102 were originally formed.

OBJECT AND SUMMARY OF THE INVENTION

Thus, the present invention was proposed with the conventional actual circumstances taken into consideration and it is an object to provide an optical recording medium capable of being reproduced by a conventional drive device which meets an optical disk having grooves formed and one having no groove in an area where bits are formed.

FIG. 10 shows the relation between the output level of a push-pull signal PP obtained by light reflected and diffracted from pits and the depth of the pits. As illustrated in the figure, the output level of the push-pull signal PP obtained by the reflected and diffracted light from the pits reaches its peak, when the depth of the pits is approximately $\lambda/(8n)$. Then, the output level of the push-pull signal PP is gradually lowered as the pits become deeper, and becomes zero when the depth of the pits is approximately $\lambda/(4n)$. However, when the output level of the push-pull signal PP reaches its opposite phase and is increased when the depth of the pits is more increased, and then reaches its peak again when the depth of the pits is about $(3\lambda)/(8n)$. After that, as the pits become deeper, the output level of the push pull signal PP is lowered and becomes zero again when depth of the pits is approximately $\lambda/(2n)$. As described above, as the depth of the pits is increased, the polarity of the push-pull signal PP obtained by the reflected and diffracted light from the pits is inverted. Thus, as a result of paying attention to the fact that the polarity of the push-pull signal PP is inverted as the depth of the pits is increased in such a way, the present invention has been made.

In the meantime, for achieving the above described object, in accordance with one aspect of the present invention, there is provided an optical recording medium comprising a base having pits embodying information signals formed in the shapes of protruding and recessed parts, wherein, when it is assumed that the refractive index of the base of the optical recording medium is n and the wavelength of light used for reproduction is $\lambda$, the depth of the pits is located within a range of $\lambda/(4n)$ to $\lambda/(2n)$, the width of the pits is located within a range of 0.3 to 0.6 um and the wavelength $\lambda$ of the light is not longer than 795 nm.

There are specifically enumerated, as the optical recording media, an optical recording medium utilizing light having a wavelength $\lambda$ which is within a range of 770 to 795 having pits with depths within a range of 170 to 220 nm, an optical disk utilizing light having a wavelength $\lambda$ within a range of 675 to 695 nm and the depth of the pits of which is within a range of 160 to 200 nm, an optical disk utilizing light having a wavelength $\lambda$ within a range of 770 to 795 nm or 675 to 695 nm and having pits with depths within a range of 170 to 200 nm or the like.

It should be noted that the pits of the above described optical recording medium are not limited to pits formed on an area exclusive for reproduction, but may be pits formed in a recording area in which information signals can be written.

As stated above, assuming that the depth of the pits is located within a range of $\lambda/(4n)$ to $\lambda/(2n)$, the polarity of a push-pull signal is inverted by light reflected and diffracted from the pits. Accordingly, with the optical recording medium according to the present invention in which it is assumed that the depth of the pits is within a range of $\lambda/(4n)$ to $\lambda/(2n)$, a push-pull signal PP similar to a push-pull signal which is obtained by the light reflected and diffracted by grooves can be also obtained by the light reflected and diffracted by the pits.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Now, referring to the accompanying drawings, preferred embodiments to which the present invention is applied will be described in detail. It should be noted that the present invention are not limited to examples mentioned below, and may be arbitrarily changed without departing from the gist of the invention.

Figure 1:
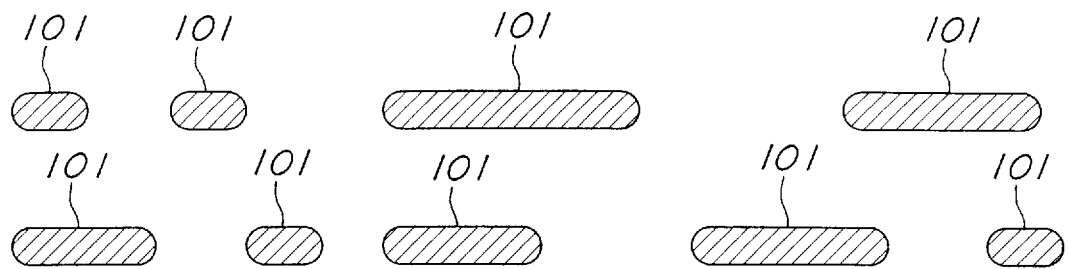
FIG. 1 is a plan view for schematically showing the format of a conventional optical disk exclusive for reproduction.
Figure 2:
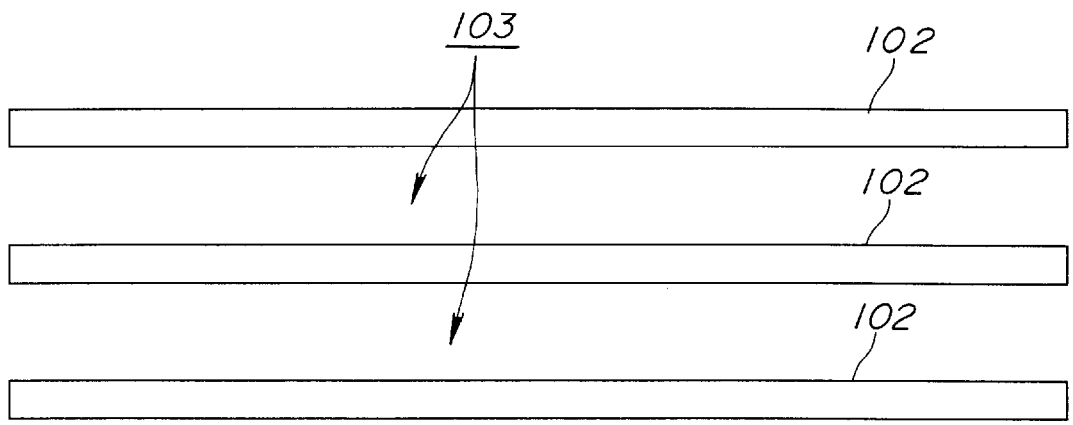
FIG. 2 is a plan view for schematically showing the format of a conventional optical recording disk.
Figure 3:
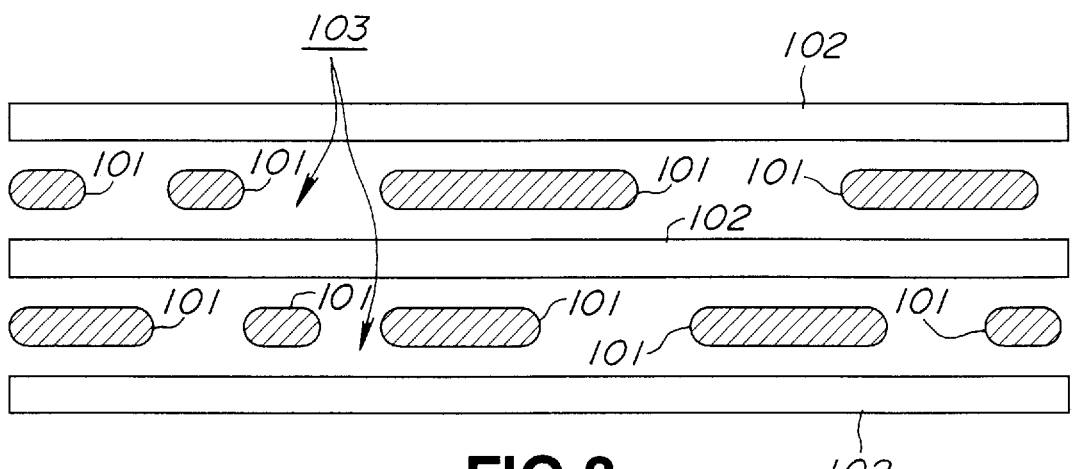
FIG. 3 is a plan view for schematically showing a format when the conventional optical recording disk is exclusively used for reproduction.
Figure 4:
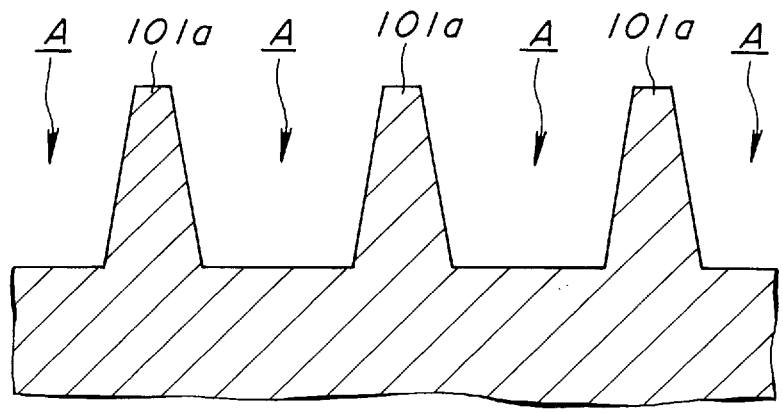
FIG. 4 is a sectional view showing a stamper for the conventional optical disk exclusive for reproduction.
Figure 5:
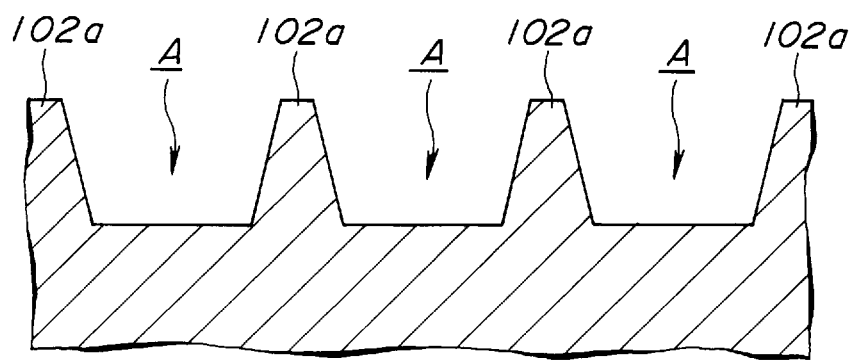
FIG. 5 is a sectional view illustrating a stamper for the conventional optical recording disk.
Figure 6:
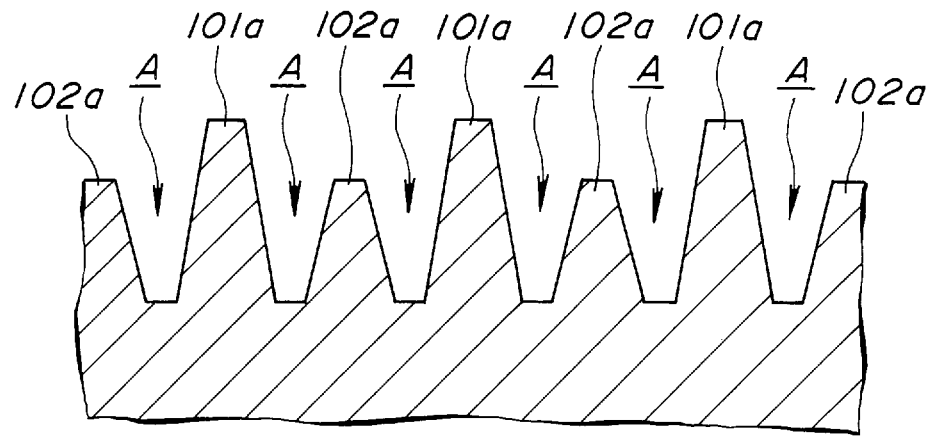
FIG. 6 is a sectional view showing a stamper used when the conventional optical recording disk is manufactured as a disk exclusive for reproduction.
Figure 7:
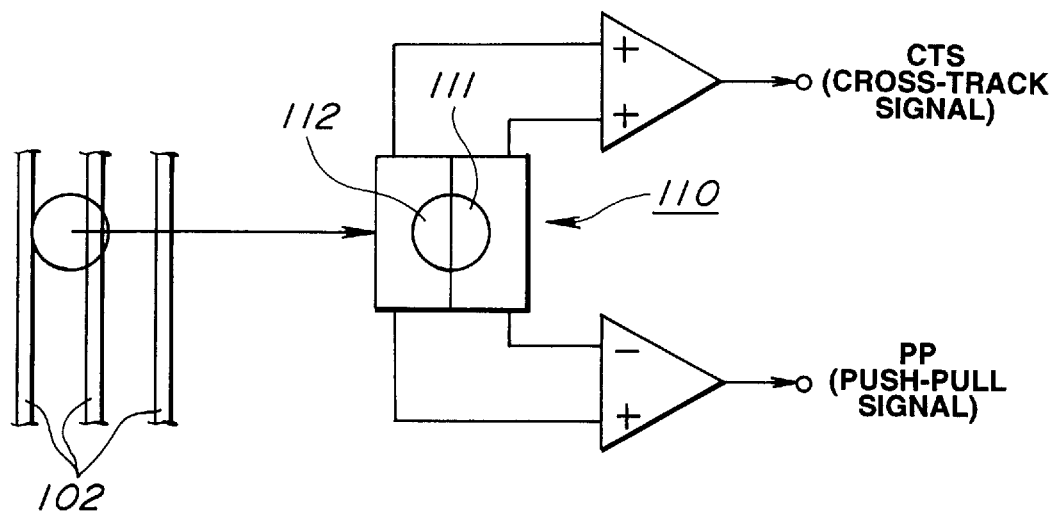
FIG. 7 is a view for explaining a push-pull signal and a cross-track signal.
Figure 8:
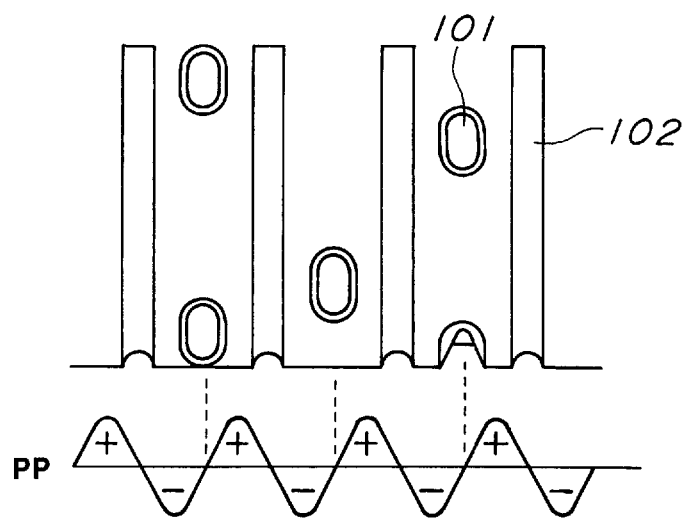
FIG. 8 is a view showing a push-pull signal obtained from an optical disk having both pits and grooves.
Figure 9:
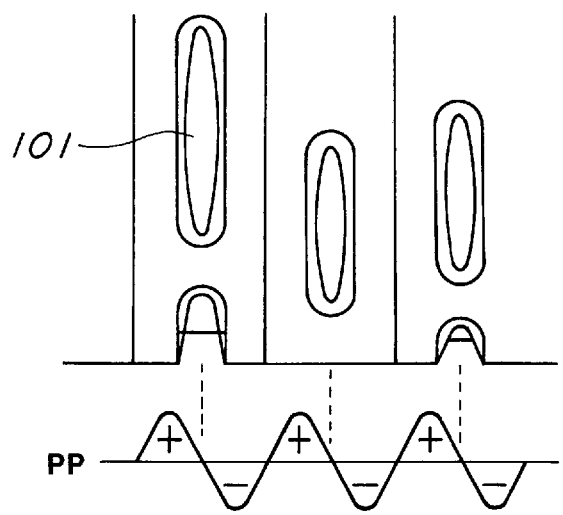
FIG. 9 is a view illustrating a push-pull signal obtained from an optical disk having only pits.
Figure 10:
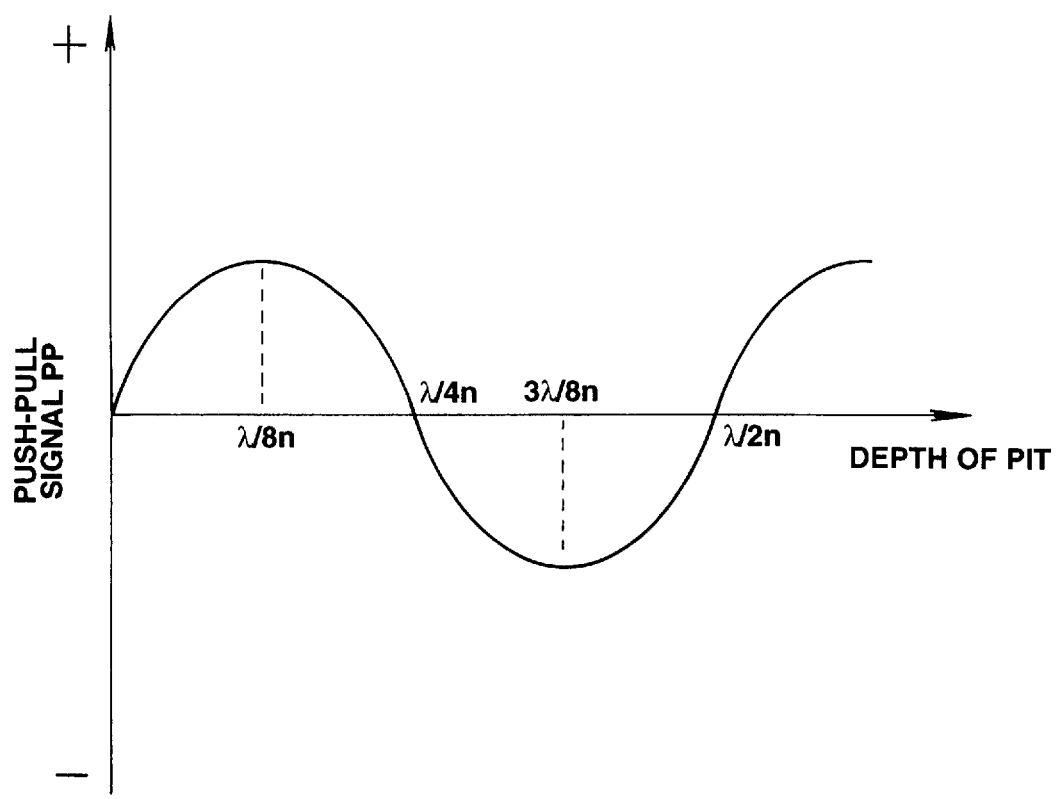
FIG. 10 is a view showing the relation between a push-pull signal and the depth of pits.
Figure 11:
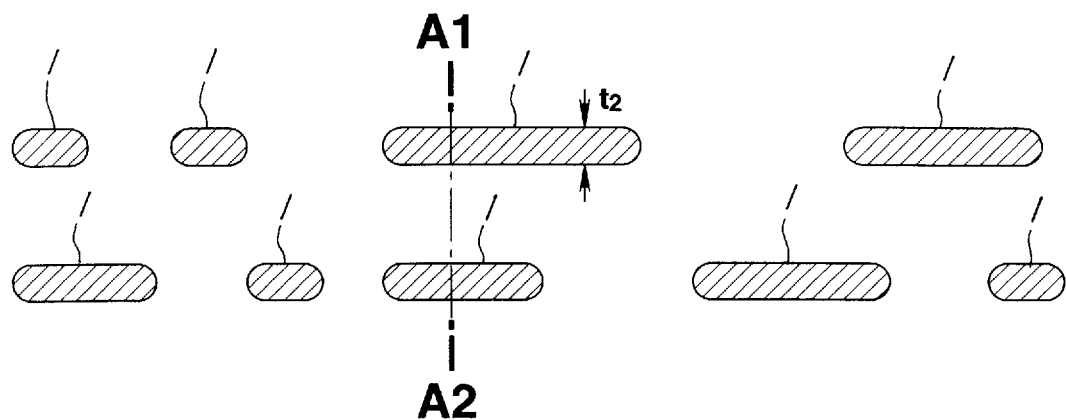
FIG. 11 is a plan view for schematically illustrating the format of an optical disk to which the present invention is applied.
Figure 12:
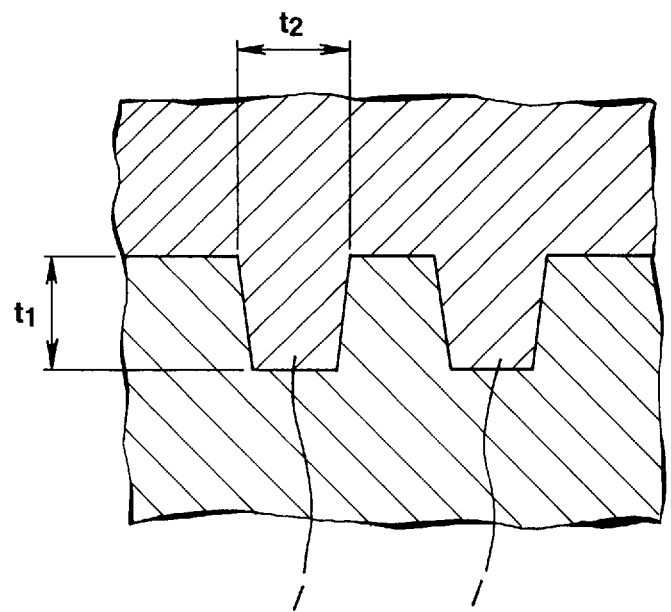
FIG. 12 is a sectional view taken along a line A1–A2 in FIG. 11.

An optical recording medium according to an embodiment of the invention is an optical disk and has, as illustrated in FIGS. 11 and 12, pits showing information signals previously formed in the shapes of protruding and recessed parts at least on a part of the surface of the disk. Then, grooves are not formed in the part in which the pits 1 are formed. Herein, when it is assumed that the refractive index of the base of the optical disk is n and the wavelength of light used for reproduction is $\lambda$, the depth t1 of the pits ranges from $\lambda/(4n)$ to $\lambda/(2n)$. However, when the t1 of the pits 1 is made deeper than required, the productivity of the disk is deteriorated. Thus, the depth t1 of the pits 1 is preferably about $(3\lambda)/(8n)$. Further, it is assumed that the width of the pits ranges from 0.3 to 0.6 $\mu$m.

As in the case of an optical disk according to an ISO/IEC 13549 standard or an ISO/IEC 13963 standard described below, when the wavelength $\lambda$ of light employed during reproduction is 770 to 795 nm, the depth t1 of the above described pits 1 is preferably located within a range of 170 to 220 nm. Further, as in the case of an optical disk according to a five times density disk mentioned below, when the wavelength $\lambda$ of the light used during the reproduction of information signals ranges from 675 to 695 nm, the depth t1 of the pits 1 is preferably located within a range of 160 to 200 nm.

Simulations are performed for the optical disks according to specific standards, concerning the relation between the shapes of the pits 1 and detected signals. Thus, the obtained results will be described below. Although, in the explanation stated below, specific ISO standards are exemplified, it is to be noted that the present invention is not limited to the optical disks according to these standards. Further, although, in the explanation mentioned below, results are represented which are obtained from simulations utilizing an FFT analysis based on a scalar diffraction theory, it should be understood that the present invention be not limited by parameters used in the simulations.

Initially, the optical disk according to the ISO/IEC 13549 standard or the ISO/IEC 13963 standard will be described as an example.

The ISO/IEC 13549 standard is a standard for storing the information signals of 1.3 Gbyte on both the surfaces of a photo electromagnetic disk having a diameter of 130 mm. The ISO/IEC 13963 standard is a standard for storing the information signals of 230 Mbyte on one surface of a photo electromagnetic disk having a diameter of 90 mm. In the ISO/IEC 13549 standard or the ISO/IEC 13963 standard (these standards are generally referred to as a double density MO standard, hereinafter), the wavelength $\lambda$ of light used for reproduction is specified to be 770 to 795 nm. Further, in the basic structure of the optical disk according to the double density MO standard, it is assumed that a track pitch is 1.39 $\mu$m, a recording density is 0.86 $\mu$m/bit and a modulating system is a system of (2.7) RLL bit position modulation. In the optical disk according to the two double density MO standard, it has been conventionally assumed that the width of the pits is approximately 0.5 $\mu$m and the depth of the pits is approximately 120 nm.

Figure 13:
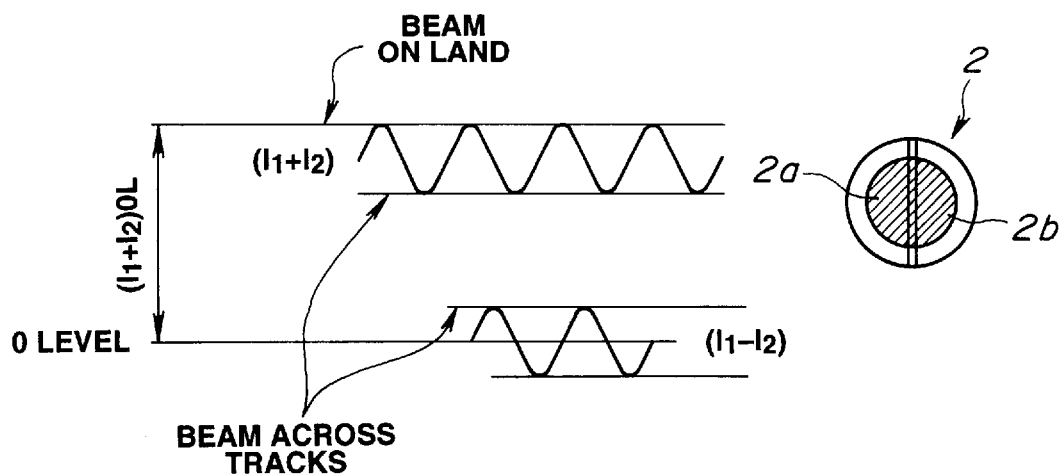
FIG. 13 is a view showing the definition of a push-pull signal and a cross-track signal in accordance with a double density MO standard.

A push-pull signal PP and a cross-track signal CTS of the optical disk according to the double density MO standard are defined as illustrated in Fig.13. In other words, when it is assumed that the quantity of light detected by the first light receiving part 2a of a two-piece light quantity detector 2 is I1, the quantity of light detected by the second light receiving part 2b of the two-piece light quantity detector 2 is I2 and the sum of the quantity of light I1 detected by the first light receiving part 2a and the quantity of light I2 detected by the second light receiving part 2b, when a light spot is located on a land, is $(I1+I2)_{OL}$, the push-pull signal PP of the optical disk according to the double density MO standard is defined as a signal expressed by a following expression (1), and the cross-track signal CTS of the optical disk according to the double density MO standard is defined as a signal expressed by a following expression (2). That is, the push-pull signal PP and the cross-track signal CTS in the optical disk according to the double density MO standard are standardized based on the quantity of return light from the land.

$$\text{Push-pull signal } PP=(I1-I2)/(I1+I2)_{OL} \quad (1)$$

$$\text{Cross-track signal } CTS=(I1+I2)/(I1+I2)_{OL} \quad (2)$$

Further, the amplitude of the push-pull signal PP and the cross-track signal CTS employed for the tracking control of an area in which the pits are formed in the optical disk according to the double density MO standard, is specified as described below.

When the polarizing direction of a laser light is parallel to a track, $$0.35 \leq \text{a push-pull signal } PP \leq 0.90$$

$$0.12 \leq \text{a cross-track signal } CTS \leq 0.60$$

When the polarizing direction of a laser light is perpendicular to a track, $$0.22 \leq \text{a push-pull signal } PP \leq 0.70$$

$$0.20 \leq \text{a cross-track signal } CTS \leq 0.75$$

Since, in the explanation described below, the simulation is carried out based on the scalar diffraction theory, effects depending on the difference in the polarizing direction of optical systems cannot be described. However, a qualitative deduction can be made. Further, a disk having a desired characteristic can be easily manufactured by slightly tuning around a range predicted by the simulation based on the scalar diffraction theory. Thus, according to the present embodiment, the shapes of the pits are determined so as to have a value in the vicinity of the central value of the specification for both polarizing lights perpendicular and parallel relative to the track.

The results, will be described hereinafter, which are obtained when the simulation is carried out concerning the relation between the shapes of the pits and detected signals, in case where only the pits are formed on the optical disk according to the double density MO standard.

Figure 14:
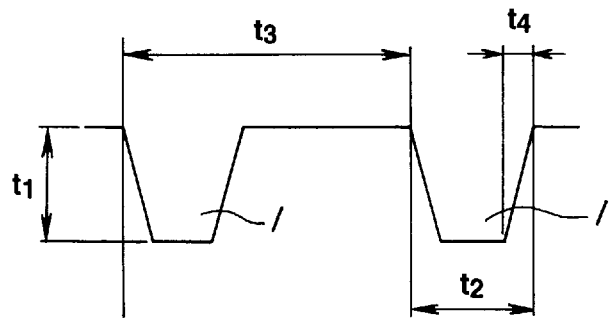
FIG. 14 is a schematic view illustrating the forms of pits to be simulated.

In the below described simulations, as shown in FIG. 14, when it is assumed that a track pitch t3 is 1.39 $\mu$m and tapers t4 at both sides of the pits 1 are 0.1 $\mu$m, and the depth t1 and width t2 of the pits 1 are changed, the tendency of detected signals was examined. In the simulations described below, it is assumed that, as the optical system of a drive device, an optical disk has wavelength $\lambda$ of 780 nm, the number of apertures NA of 0.55 and A/W=(1.0, 1.0), which has been mainly used when a standard is established, and whose base is made of polycarbonate having its refractive index n of 1.58.

Figure 15:
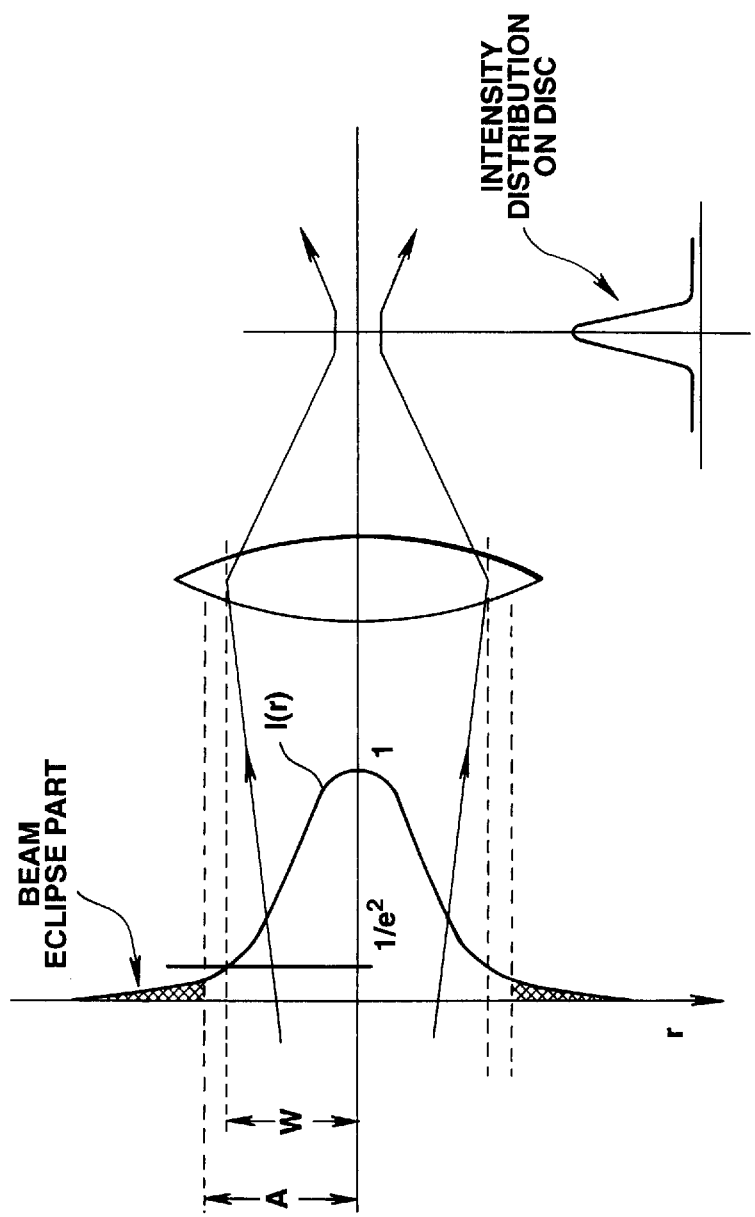
FIG. 15 is a schematic view showing a state where a Gauss beam makes incident upon an objective lens.

Herein, A/W (Filling of Lens) is one of parameters of the optical system for specifying the intensity distribution of light on a surface irradiated with light. This is an index for indicating what degree of laser light is shaded or eclipsed by an objective lens, when the laser light, which is approximated to the beam of a Gaussian distribution, is used as a recording and/or reproducing light made incident upon the optical disk. Namely, as illustrated in FIG. 15, A designates the effective radius of the objective lens, W designates the spot size of the laser light on the objective lens, that is, a diameter of the laser light at the position in which the intensity of light is $1/e^2$ when it is assumed that the intensity of light at the center of a beam is 1. In the simulations mentioned below, it is assumed that the spot of the laser light made incident upon the optical disk is circular in its shape, and the effect of the polarizing direction is neglected. Accordingly, it is assumed that the spot size $W_x$ of the laser light made incident in the x direction and the spot size $W_y$ in the y direction are equal to each other and they are calculated based on the scalar diffraction theory. Namely, in the simulations mentioned below, it is assumed that A/$W_x$= A/$W_y$ in A/W=(A/$W_x$, A/$W_y$).

Figure 16:
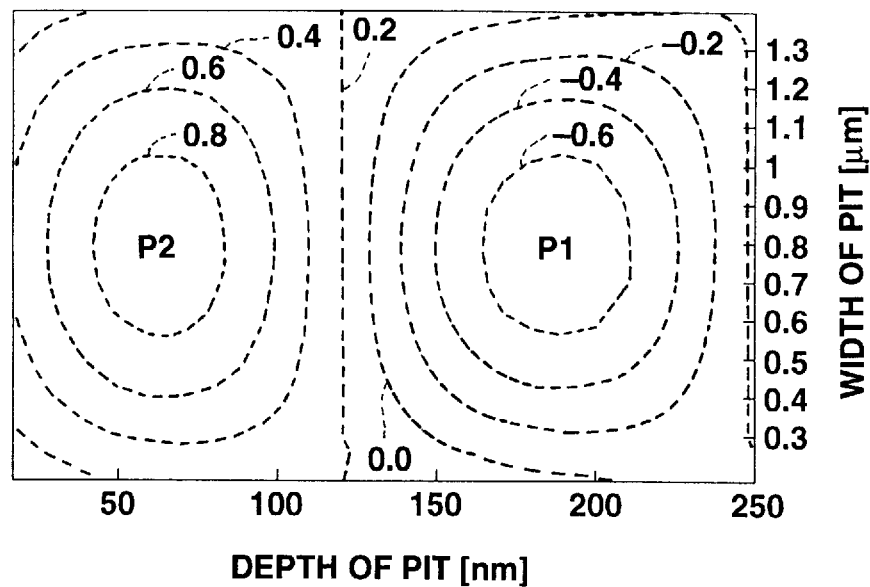
FIG. 16 is a characteristic view of a push-pull signal (mirror standard) when $\lambda$ is 780 nm.

Initially, results are shown in FIG. 16, which are obtained when the peak values of the push-pull signal PP are calculated during passing of a light spot on the pits by using the depth and width of the pits as parameters. The push-pull signal PP is, for convenience, standardized based on the quantity of return light from the surface of a mirror. Herein, since the wavelength $\lambda$ of a light source is 780 nm and the refractive index n of a base is 1.58, about 62 nm corresponds to $\lambda/(8n)$, about 124 nm corresponds to $\lambda/(4n)$, and about 165 nm corresponds to $\lambda/(3n)$. As can be understood from FIG. 16, the push-pull signal PP reaches its peak when the depth of the pits is approximately $\lambda/(8n)$, then, its level is gradually decreased as the depth of the pits is increased, and reaches zero when the depth of the pits is about $\lambda/(4n)$. Then, when the depth of the pits is further increased, the polarity of the push-pull signal is inverted, the push-pull signal PP reaches again its peak when the depth of the pits is about (3 $\lambda)/(8n)$, then, its level is decreased as the depth of the pits is increased and becomes zero again when the depth of the pits is about $\lambda/2(n)$.

Therefore, the depth of the pits is located within a range of $\lambda/(4n)$ to $\lambda/(2n)$ so that the push-pull signal PP of the polarity corresponding to the double density MO standard can be obtained. Specifically, according to the optical disk based on the double density MO standard, the amplitude of the push-pull signal PP is preferably increased in a part designated by P1 in FIG. 16, since the polarity is proper. On the other hand, the amplitude of the push-pull signal PP is undesirably increased in a part shown by P2 in FIG. 16, since the polarity is inverted.

Figure 17:
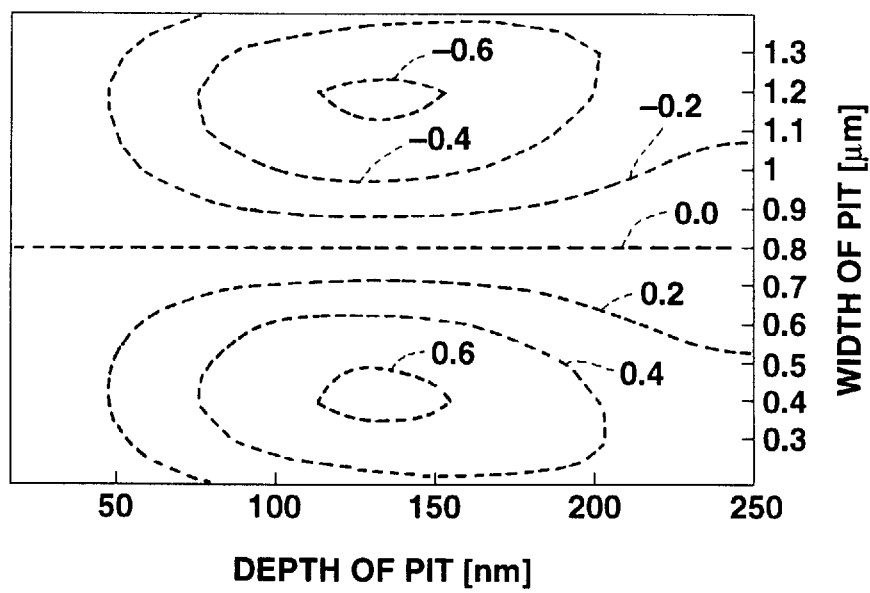
FIG. 17 is a characteristic view of a cross-track signal (mirror standard) when $\lambda$ is 780 nm.

Next, results, are shown in FIG. 17, which are obtained when the peak values of the cross-track signal CTS are calculated during passing of a light spot on the pits. Herein, the cross-track signal CTS is, for convenience, standardized based on the quality of return light from the surface of a mirror. As can be seen from FIG. 18, the amplitude of the cross-track CTS becomes maximum when the depth of the pits is located in the vicinity of $\lambda/(4n)$ and is decreased before and after $\lambda/(4n)$. Namely, the level of the cross-track signal when the depth of the pits is located within a range of $\lambda/(4n)$ to $\lambda/(2n)$ is the same as that when the depth of the pits is located within a range of $\lambda/(8n)$ to $\lambda/(4n)$. Further, the cross-track signal CTS becomes maximum when the width of the pits is approximately 0.4 $\mu$m. Then, when the width of the pits exceeds a half of a track pitch, the quantity of return light from the pits of large width is increased, so that the polarity of the cross-track signal CTS is inverted. Therefore, the width of the pits is preferably located in the vicinity of 0.4 $\mu$m and needs to be at least not larger than the half of the track pitch.

Figure 18:
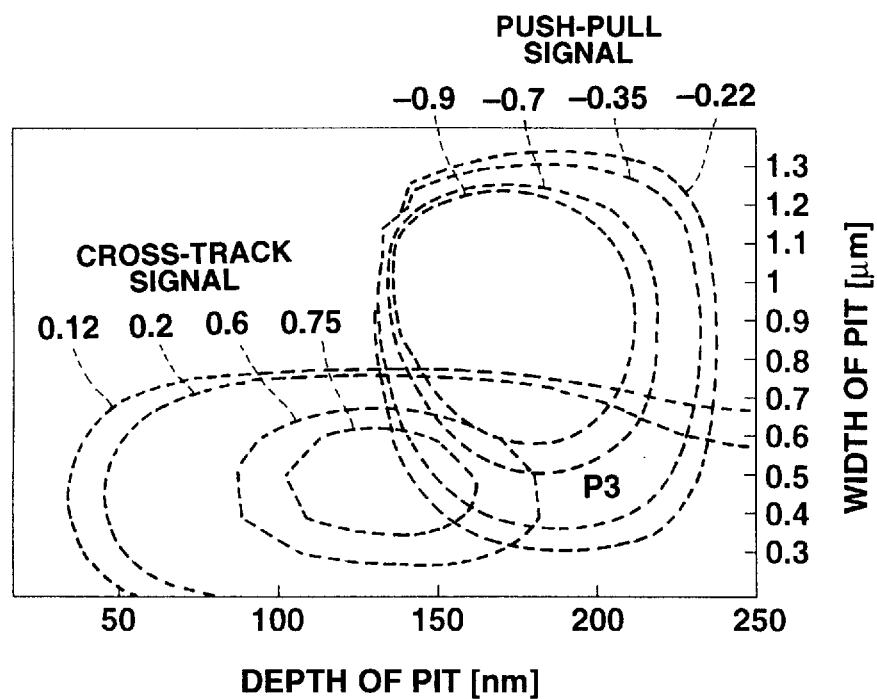
FIG. 18 is a characteristic view of the push-pull signal and the cross-track signal (mirror standard) when $\lambda$ is 780 nm.

As mentioned above, the operations of the push-pull signal PP and the cross-track signal CTS were roughly understood from the simulation results illustrated in FIGS. 16 and 17. However, as mentioned above, according to the double density MO standard, the push-pull signal PP and the cross-track signal CTS are standardized not based on the quantity of light returning from the surface of a mirror but based on the quantity of light returning from lands. Thus, FIG. 18 illustrates results obtained by calculating the push-pull signal PP which is standardized based on the quantity of light returning from the lands and results obtained by calculating the cross-track signal CTS which is standardized based on the quantity of light returning from the lands.

Regarding the above stated calculations, while levels of −0.02, −0.35, −0.70, and −0.90 for the push-pull signal PP were calculated, levels of 0.12, 0.20, 0.60, and 0.75 for the cross-track signal CTS were calculated by taking into consideration the push-pull signal PP and the cross-track signal CTS required for the optical disk in accordance with the double density MO standard. Thus, a range P3 surrounded by respective curves in FIG. 18 becomes a range preferable for the optical disk formed in accordance with the double density MO standard. More specifically, it is understood that the optical disk formed in accordance with the double density MO standard is preferably used in which the depth of the pits is located within a range of about 170 to 220 nm and the width of the pits is located within a range of about 0.3 to 0.6 $\mu$m (the optical disk having such shapes of pits is referred to as an optical disk of a first embodiment, hereinafter).

Now, results, will be described below, which are obtained whether proper information signals can be detected from the optical disk of the first embodiment or not.

As stated above, since it is assumed that the recording density is 0.86 $\mu$m/bit and a modulating system is a type of (2, 7) RLL pit position modulation, the shortest pattern has 1.29 μm and the longest pattern has 3.44 μm.

Figure 19:
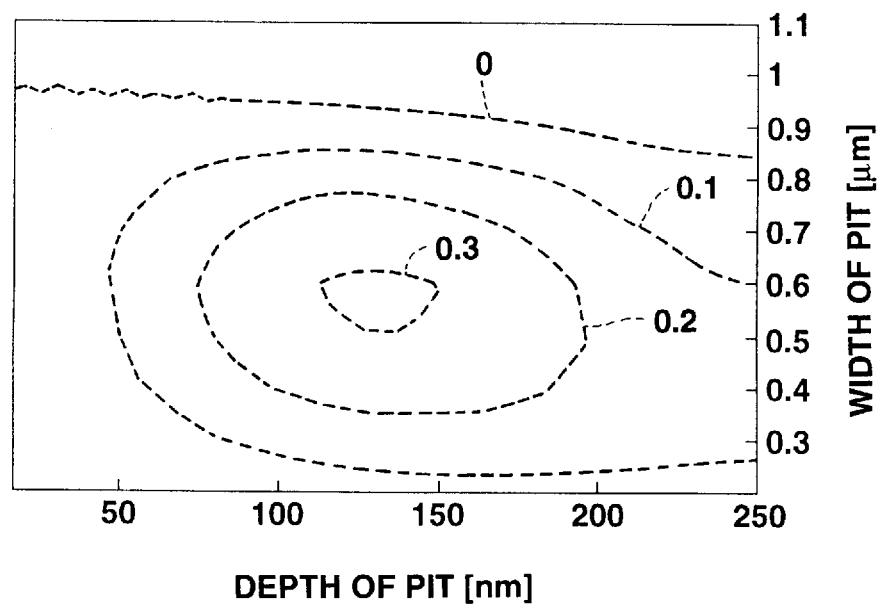
FIG. 19 is a characteristic view of a 3T signal when $\lambda$ is 780 nm.

Thus, a 3T signal which is a signal from the shortest pattern was standardized based on the quantity of light returning from the surface of the mirror, using the width and depth of the pits as parameters. The obtained results are shown in FIG. 19. As can be understood from FIG. 19, the 3T signal becomes maximum when the depth of the pits is near $\lambda/(4n)$ and is decreased around $\lambda/(4n)$. That is, the level of the 3T signal when the depth of the pits ranges from $\lambda/(4n)$ to $\lambda/(2n)$ is the same as that when the depth of the pits ranges from $\lambda/(8n)$ to $\lambda/(4n)$. Accordingly, the 3T signal having the same level as that of a conventional optical disk can be also obtained by the optical disk of the first embodiment.

Figure 20:
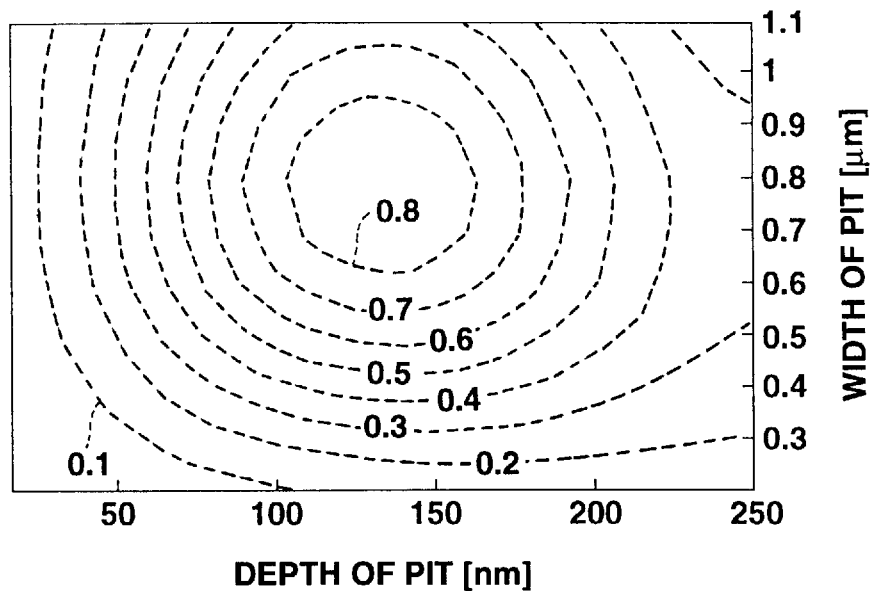
FIG. 20 is a characteristic view of a 8T signal when $\lambda$ is 780 nm.

Next, an 8T signal which is a signal from the longest pattern was standardized and obtained based on the quantity of light returning from the surface of the mirror, using the width and depth of the pits as parameters. The obtained results are shown in FIG. 20. As can be seen from FIG. 20, the level of the 8T signal becomes maximum when the depth of the pits is located in the vicinity of $\lambda/(4n)$ and is decreased around $\lambda/(4n)$. That is, the level of the 8T signal obtained when the depth of the pits ranges from $\lambda/(4n)$ to $\lambda/(2n)$ is the same as that obtained when the depth of the pits ranges from $\lambda/(8n)$ to $\lambda/(4n)$. Accordingly, the 8T signal having the same level as that of the conventional optical disk can be obtained by the optical disk of the first embodiment.

Figure 21:
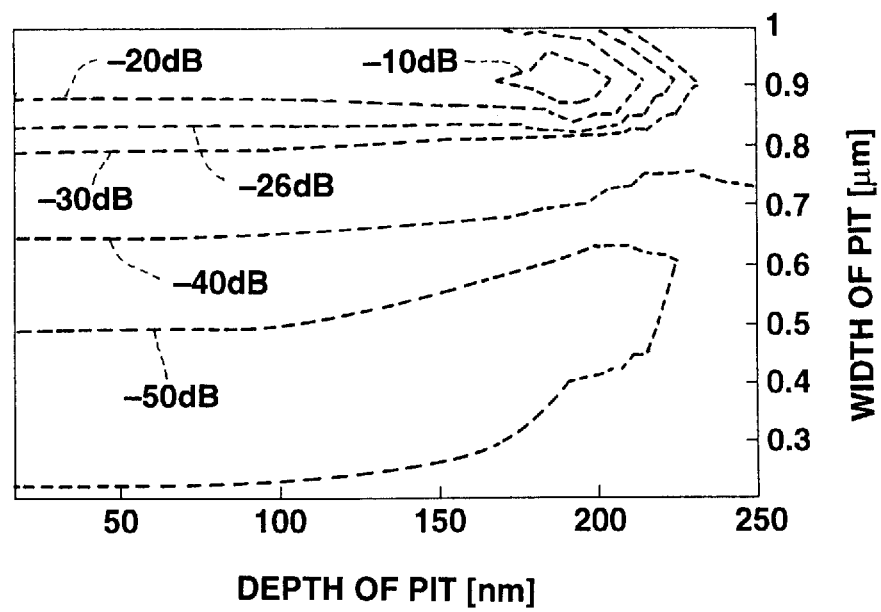
FIG. 21 is a characteristic view of a crosstalk when $\lambda$ is 680 nm.

Now, results are shown in FIG. 21, which are obtained by calculating a crosstalk, using the width and depth of the pits as parameters. Herein, the crosstalk is defined as a leaking signal amplitude from the pit of the longest pattern of an adjacent track relative to a signal amplitude from the pit of the shortest pattern. More specifically, FIG. 21 shows the crosstalks of the 8T signal and the 3T signal. As can be seen from FIG. 21, the crosstalk is preferably sufficiently small so that there is no problem in the optical disk of the first embodiment in which it is assumed that the width of the pits ranges about 0.3 to 0.6 μm.

As apparent from the results illustrated in FIGS. 19 to 21, the proper information signals can be obtained from the optical disk of the first embodiment. Namely, according to the embodiment of the present invention, while the quality of the signals required in the optical disk based on the double density MO standard is satisfied, the grooves can be removed from the optical disk based on the double density MO standard.

An optical disk (hereinafter called five times density disk) to enhance density, storing the information signals of 640 Mbyte on one surface of a optical magnetic disk having a diameter of 90 mm, will be described as an example.

As to a five times density desk, the wave length λ of light used for reproduction is 675–695 nm, a track pitch is 1.10 μm, and a modulating system is a system of (1.7) RLL pulse width modulation.

Under the five times density disk, the push-pull signal PP is defined by the above mentioned expression (1), similarly to the double density MO standard. The cross-track CTS is similarly defined by the above described expression (2). The amplitude of the push-pull signal and the cross-track signal CTS used for a tracking control in an area in which the pits are formed are specified as described below.

When the polarizing direction of the laser light is parallel to a track, $$0.20 \leq \text{push pull signal } PP \leq 0.60$$

$$0.45 \leq \text{cross-track signal } CTS \leq 0.90$$

When the polarizing direction of a laser light is perpendicular to a track, $$0.20 \leq \text{push-pull signal } PP \leq 0.60$$

$$0.30 \leq \text{cross-track signal } CTS \leq 0.75$$

Results, will be shown below, which are obtained from a simulation carried out concerning the relation between the shapes of the pits and detected signals when only the pits are formed and the grooves are not formed on a five times density disk. In the simulation described below, it is assumed that a track pitch is 1.1 μm and tapers at both sides of the pits are 0.1 μm, the width and depth of the pits are changed and the tendency of the detected signals is examined. Further, in the simulation described below, as an optical system of a drive device, it is assumed that an optical disk has a wavelength λ of 680 nm, the number of apertures NA of 0.55, A/W=(0.85, 0.85) and is composed of a material, that is, polycarbonate having a refractive index n of 1.58.

Figure 22:
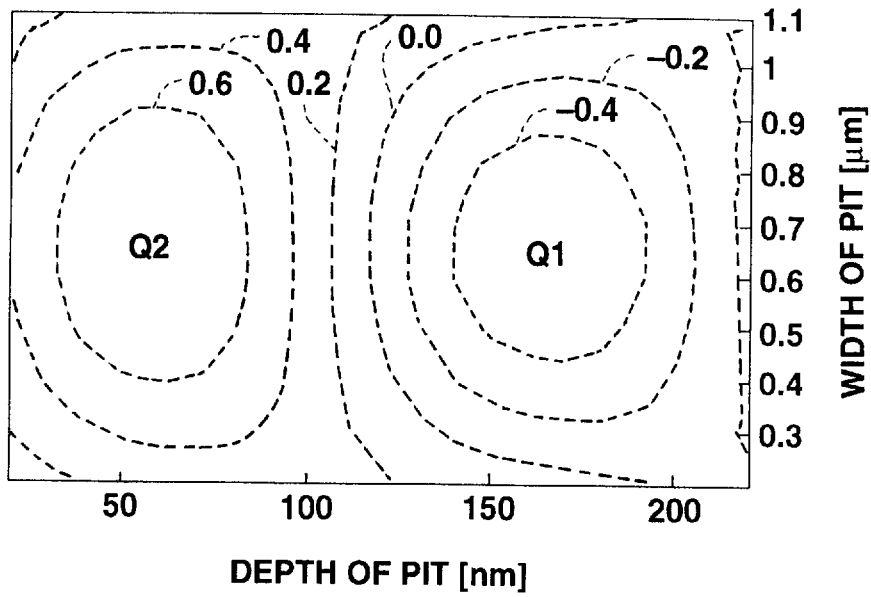
FIG. 22 is a characteristic view of a push-pull signal (mirror standard) when $\lambda$ is 680 nm.

Initially, results, are shown in FIG. 22, which are obtained by calculating the peak values of the push-pull signal PP using the width and depth of the pits as parameters, when a light spot passes the pits of a 8T mark which is the longest pattern. Herein, the push-pull signal PP is standardized, for convenience, based on the quantity of light returning from the surface of a mirror. Since the wavelength λ of a light source is 680 nm and the refractive index n of a base is 1.58, about 54 nm corresponds to $\lambda/(8n)$, about 108 nm corresponds to $\lambda/(4n)$ and about 165 nm corresponds to $(3\lambda)/(8n)$. As can be understood from FIG. 22, the level of the push-pull signal PP reaches its peak when the depth of the pits is about $\lambda/(8n)$, then, is gradually lowered when the depth of the pits is increased and becomes zero when the depth of the pits is about $\lambda/(4n)$. Further, as can be seen from the figure, when the depth of the pits is further increased, the polarity of the push-pull signal PP is inverted, the level of the push-pull signal PP reaches its peak again when the depth of the pits is about $(3\lambda)/(8n)$, then, is gradually decreased as the depth of the pits is increased, and becomes zero again when the depth of the pits is about $\lambda/(2n)$. Therefore, the depth of the pits is located within a range of $\lambda/(4n)$ to $\lambda/(2n)$, so that the push-pull signal PP of the polarity which meets the optical disk according to the five times density MO standard can be obtained. Namely, a part shown by Q1 in FIG. 22 is desired for the optical disk according to the five times density disk, since the amplitude of the push-pull signal PP is large and its polarity is correct. On the other hand, a part shown by Q2 in FIG. 22 is undesirable for the optical disk based on the five times density disk, since the amplitude of the push-pull signal is large, and, its polarity is inverted.

Figure 23:
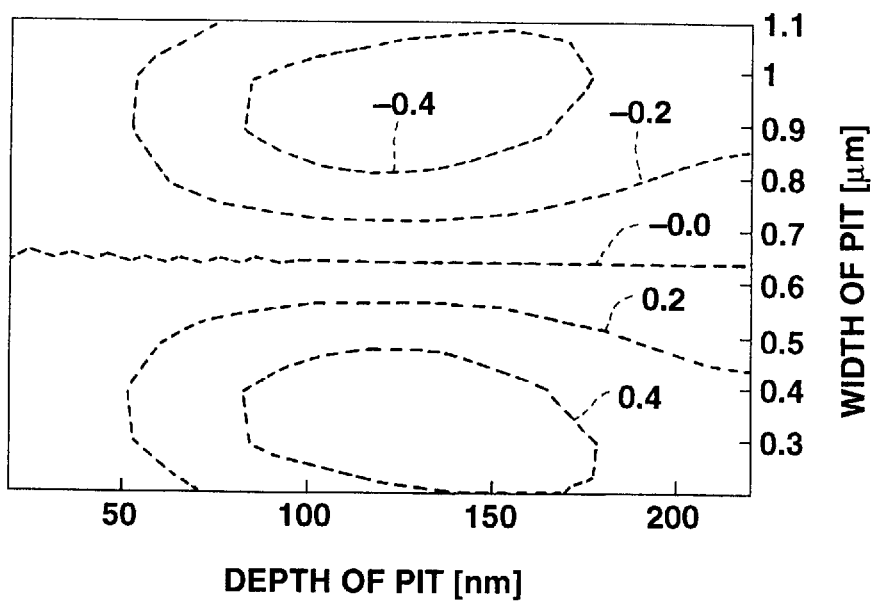
FIG. 23 is a characteristic view of a cross-track signal (mirror standard) when $\lambda$ is 680 nm.

Now, results, are shown in FIG. 23, which are obtained by calculating the peak values of the cross-track signal CTS using the width and depth of the pits as parameters, when a light spot passes the pits of a 8T mark which is the longest pattern. Herein, the cross-track signal CTS is, for convenience, standardized based on the quantity of light returning from the surface of a mirror. As apparent from FIG. 23, the level of the cross-track signal CTS reaches its maximum, when the depth of the pits is located in the vicinity of $\lambda/(4n)$ and is decreased before and after $\lambda/(4n)$. That is, the level of the cross-track signal CTS when the depth of the pits ranges from $\lambda/(4n)$ to $\lambda/(2n)$ is equal to that when the depth of the pits ranges from $\lambda/(8n)$ to $\lambda/(4n)$. Further, the level of the cross-track signal CTS becomes maximum when the width of the pits is approximately 0.35

μm. Then, when the width of the pits exceeds a half of a track pitch, the quantity of light returning from the pits of large width is increased, so that the polarity of the cross-track signal CTS is inverted. Accordingly, the width of the pits is preferably located in the vicinity of 0.35 μm and needs to be not larger than at least a half of the track pitch.

Figure 24:
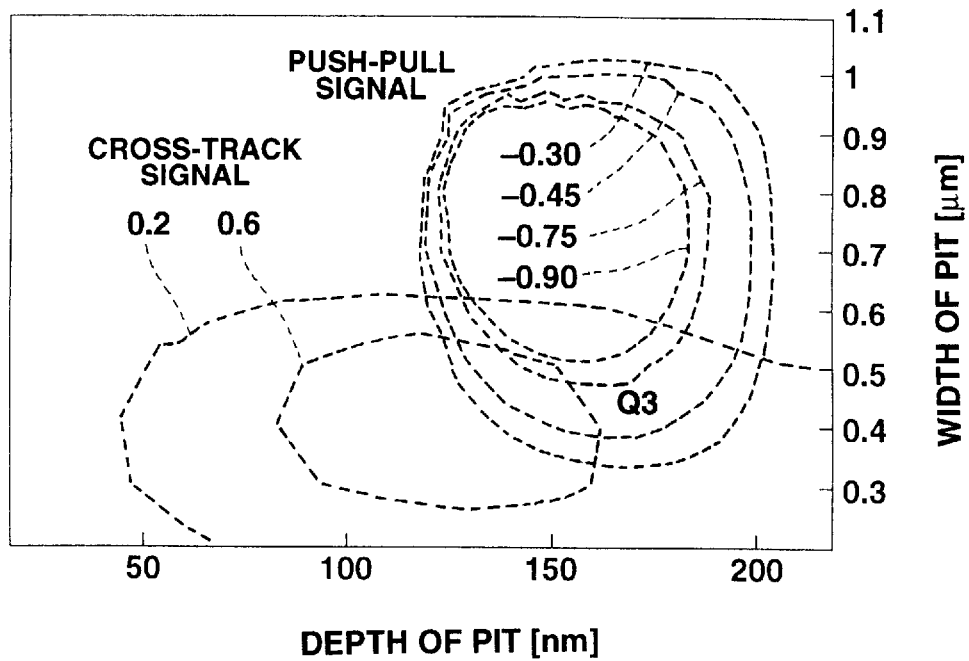
FIG. 24 is a characteristic view of the push-pull signal and the cross-track signal (mirror standard) when $\lambda$ is 680 nm.

As described above, the operations of the push-pull signal PP and the cross-track signal CTS were roughly understood from the simulation results illustrated in FIGS. 22 and 23. However, in the five times density disk, as mentioned above, the push-pull signal PP and the cross track signal CTS are standardized not based on the quantity of light returning from the surface of a mirror, but based on the quantity of light returning from lands. Thus, FIG. 24 illustrates the results obtained by calculating the push-pull signal PP which is standardized based on the quantity of light returning from the lands and the results obtained by calculating the cross-track signal CTS which is standardized based on the quantity of light returning from the lands.

Regarding the above mentioned calculation, while the levels of −0.30, −0.45, −0.75 and −0.90 of the push-pull signal PP were calculated, the levels of 0.20 and 0.60 of the cross-track signal CTS were calculated by taking into consideration the push-pull signal PP and the cross-track signal CTS required in five times density disk. Accordingly, a range Q3 surrounded by respective curves in Fig.24 is a preferable range for the five times density disk. Specifically, it is understood that the five times density disk is most preferable when the depth of the pits is approximately 160 to 220 nm and the width of the pits is approximately 0.3 to 0.5 μm (the optical disk having such shapes of the pits is called an optical disk of a second embodiment, hereinafter).

Next, results, will be described below, which are obtained by recognizing whether proper information signals can be detected from the optical disk of the second embodiment or not.

As stated above, since it is assumed that a recording density is 0.50 μm/ bit and a modulating system is a type of (1,7) RLL bit width modulation in the optical disk according to the five times density disk, the shortest pattern of the pits is 0.66 μm and the longest pattern of the pits is 2.66 μm.

Figure 25:
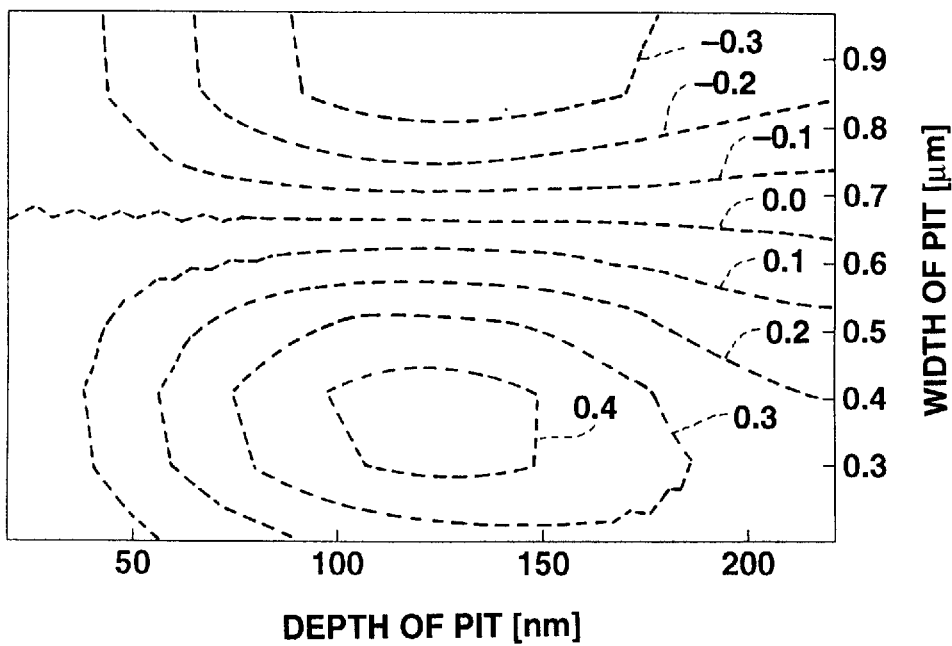
FIG. 25 is a characteristic view of a 2T signal when $\lambda$ is 680 nm.

Thus, a 2T signal which is a signal from the shortest pattern of the pits is initially standardized and obtained, based on the quantity of light returning from the surface of a mirror by using the width and depth of the pits as parameters. The obtained results are shown in FIG. 25. As can be seen in FIG. 25, the level of the 2T signal becomes maximum when the depth of the pits is located in the vicinity of $\lambda/(4n)$ and is decreased around $\lambda/(4n)$. That is, the level of the 2T signal when the depth of the pits ranges from $\lambda/(4n)$ to $\lambda/(2n)$ is the same as that when the depth of the pits ranges from $\lambda/(8n)$ to $\lambda/(4n)$. Accordingly, the 2T signal having the level equal to that of a conventional optical disk can be also gained by the optical disk of the second embodiment.

Figure 26:
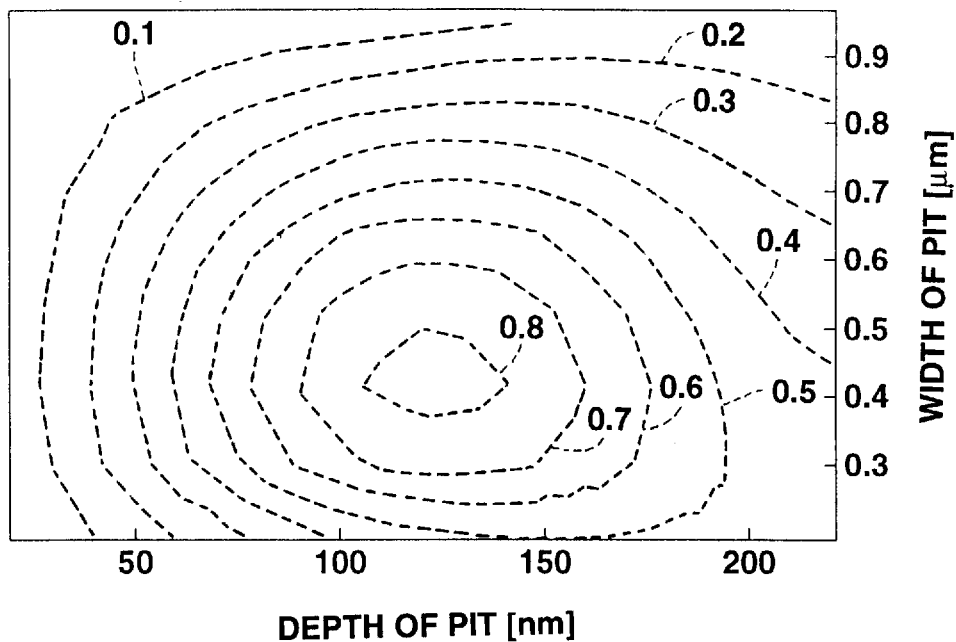
FIG. 26 is a characteristic view of a 8T signal when $\lambda$ is 680 nm.

Then, an 8T signal which is a signal from the longest pattern was standardized and obtained based on the quantity of light returning from the surface of a mirror by using the width and depth of the pits as parameters. The obtained results are shown in FIG. 26. As can be understood from FIG. 26, the 8T signal becomes maximum when the depth of the pits is in the vicinity of $\lambda/(4n)$ and is decreased around $\lambda/(4n)$. More particularly, the level of the 8T signal obtained when the depth of the pits is located within a range of $\lambda/(4n)$ to $\lambda/(2n)$ is the same as that obtained when the depth of the pits is located within a range of $\lambda/(8n)$ to $\lambda/(4n)$. Accordingly, the 8T signal of the same level as that of the conventional optical disk can be also obtained by the optical disk of the second embodiment.

Figure 27:
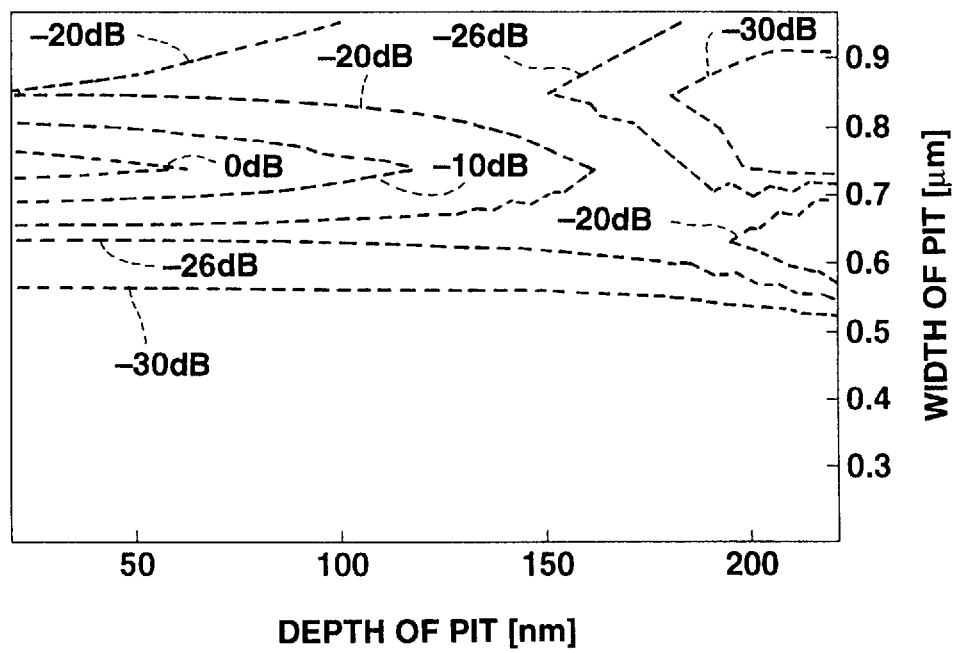
FIG. 27 is a characteristic view of a crosstalk when $\lambda$ is 680 nm.

Next, results, are shown in FIG. 27, which are obtained by calculating a crosstalk by using the width and depth of the pits as parameters. Herein, the crosstalk is defined as a leaking signal amplitude from the pits of the longest pattern of an adjacent track, relative to a signal amplitude from the pits of the shortest pattern. Specifically, FIG. 27 illustrates the crosstalk of the 8T signal and the 2T signal. As can be understood from FIG. 27, a crosstalk is preferably sufficiently small and has no problem in the optical disk of the first embodiment in which it is assumed that the width of the pits is located within a range of about 0.3 to 0.5 μm.

In the next place, results obtained by evaluating an asymmetry are shown.

The asymmetry means a phenomenon in which the central level of a signal amplitude fluctuates depending on a data pattern recorded on the optical disk. In order to correctly read out information from the optical disk, it is desired that a threshold value upon detection of signals is constant. Then, when the signals are detected with the threshold fixed, the fluctuation of the central level of the signal amplitude directly causes the jittering of the signal amplitude to be increased, so that a reading error is more increased. Therefore, the optical disk has preferably a small asymmetry.

Figure 28:
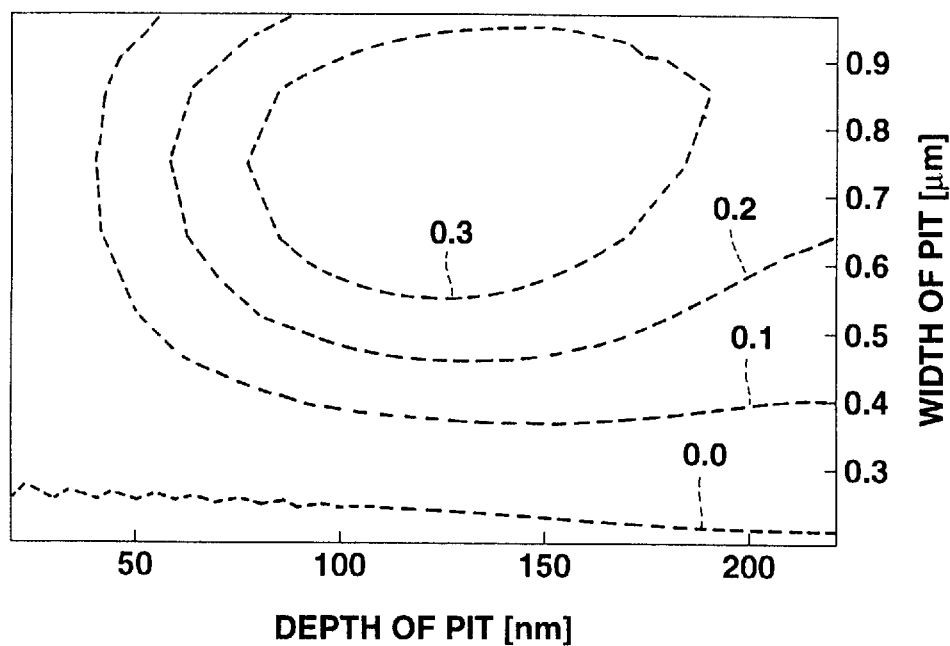
FIG. 28 is a characteristic view of an asymmetry when $\lambda$ is 680 nm.

Thus, the degree of asymmetry was calculated by using the width and depth of the pits as parameters. The obtained results are shown in FIG. 28. Herein, the degree of the asymmetry is obtained by standardizing the deviation of the center of amplitude of the 2T signal from the center of amplitude of the 8T signal based on the amplitude of the 8T signal. As apparent from FIG. 28, the larger the width of the pits becomes, the more the asymmetry is increased. Further, it is understood that the degree of asymmetry is desirably sufficiently small and there is no problem in the optical disk of the second embodiment in which it is assumed that the width of the pits ranges from about 0.3 to 0.5 μm.

As can be recognized from the above described results shown in FIGS. 25 to 28, the proper information signals can be detected from the optical disk of the first embodiment. Specifically, according to the embodiment of the present invention, while the quality of the signals required for the optical disk based on the five times density disk is satisfied, grooves can be removed from the optical disk in accordance with the five times density disk.

In the optical disk of the first embodiment and the optical disk of the second embodiment as mentioned above, the push-pull signal PP and the cross-track signal CTS are detected by the pits which are discretely formed on tracks in place of the grooves which are continuously formed along the tracks. This does not cause any troubles. Particularly, since the optical disk based on a four times density MO standard or the five times density MO standard adopts a mark length modulation method for recording information, spaces between the pits appear with a substantially equal probability. Therefore, the push-pull signal PP and the cross-track signal CTS can be sufficiently obtained only from the pits without the grooves. It is apparent from the results of compact disks or the like that a tracking control can be completely carried out in such a way by the signals obtained only from the pits.

There is a range in which the conditions of the shapes of pits in the optical disk of the first embodiment and those of the shapes of pits in the optical disk of the second embodiment overlap each other. Thus, the conditions of the shapes of pits are set to the part in which the conditions of the shapes of pits overlap each other, so that both the conditions including the double density MO standard and the five times density disk can be satisfied. More particularly, it is assumed that the depth of the pits ranges from 170 nm to 200 nm and the width of the pits ranges from 0.3 μm to 0.5 μm, so that both the standards including the double density MO standard and the five times density conditions can be satisfied. Since such an optical disk satisfies both the standards including the double density MO standard and the five times density disk, it may become an optical disk excellently balanced with both the drive devices including the drive device which meets the optical disk in accordance with the double density MO standard using light whose wavelength is about 780 nm and the drive device which meets the optical disk in accordance with the five times density disk using light whose wavelength is about 680 nm.

The present invention is not limited to an optical disk exclusive for reproduction ( called a ROM disk, hereinafter) only provided with an area exclusive for reproduction in which information signals are previously written by pits. More particularly, the present invention can be applied to an optical disk (referred to as a RAM disk, hereinafter) provided with a recording area in which the information signals can be written or an optical disk (referred to as a P-ROM disk, hereinafter) having both the area exclusive for reproduction in which the information signals are previously written by the pits and the recording area in which the information signals can be written or the like.

Figure 29:
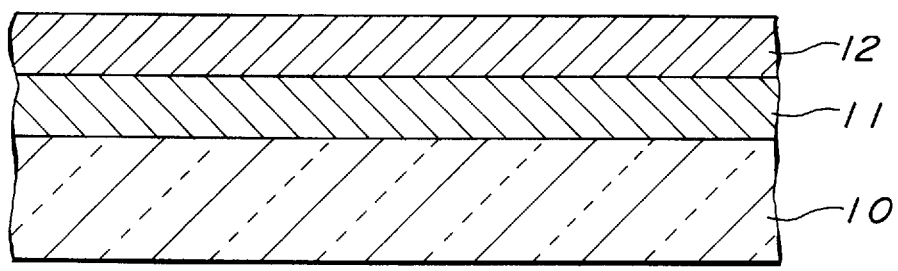
FIG. 29 is a sectional view showing an example of the area exclusive for reproduction of an optical disk.

In these optical disks, the area exclusive for reproduction is composed of, as illustrated in FIG. 29, a transparent base 10, a reflective film 11 formed thereon and a protective film 12 made of an ultraviolet ray curing resin or the like further formed on the reflective film 11. As the transparent base 10, there are enumerated, for example, polycarbonate (PC), polymethyl methacrylate (PMMA), polyvinyl chloride (PVC) or glass, etc. The reflective film 11 is made of metal such as Al, Ag, Au, Cu, Ti, Ni or the like or alloys thereof, etc.

Figure 30:
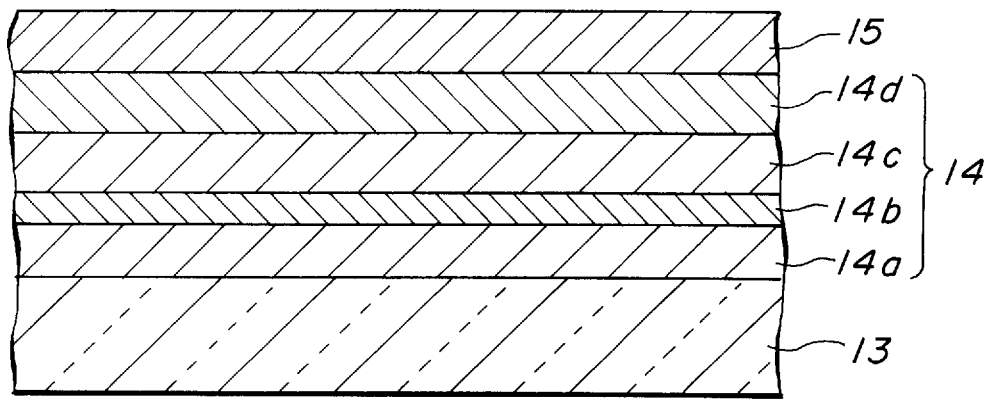
FIG. 30 is a sectional view showing an example of the recording area of a photo electromagnetic disk.

In the case of a photo electromagnetic disk, as illustrated in FIG. 30, the recording area is formed with a transparent base 13, a photo electromagnetic recording layer 14 formed thereon and a protective film 15 made of an ultraviolet ray curing resin or the like further formed on the photo electromagnetic recording layer 14. The transparent base 13 is composed of for example, polycarbonate (PC), polymethyl methacrylate (PMMA), polyvinyl chloride (PVC) or glass or the like. Herein, the photo electromagnetic recording layer 14 is preferably formed with the laminate film of a four layer structure. The four layer structure is formed by sequentially laminating a first dielectric thin film 14a composed of, for example, SiN, SiO, ZnS, etc., a rare earth-transition metal alloy thin film 14b composed of, for example, TbFeCo, GdFeCo, GdTbFeCo, DyFeCo or the like, a second dielectric thin film 14c composed of SiN, SiO, ZnS or the like and a reflective film 14d composed of metal such as Al, Ag, Au, Cu, Ti, Ni, etc. or alloys thereof, etc.

Figure 31:
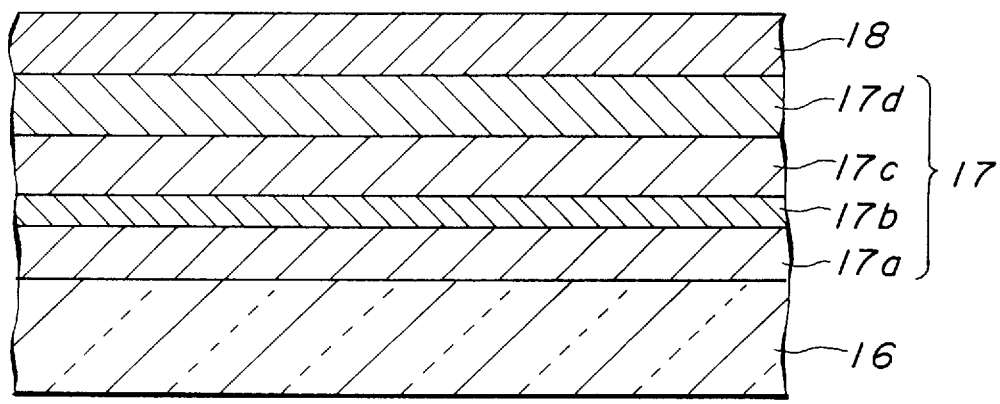
FIG. 31 is a sectional view illustrating an example of the recording area of a phase change type optical disk.

In the case of a phase change type optical disk, as illustrated in FIG. 31, the recording area is formed with a transparent base 16, a phase change type recording layer 17 formed thereon, and a protective film 18 made of an ultraviolet ray curing resin or the like further formed on the phase change type recording layer 17. The transparent base 16 is composed of, for example, polycarbonate (PC), polymethyl methacrylate (PMMA), polyvinyl chloride (PVC) or glass or the like. Herein, the phase change type recording layer 17 is preferably formed with the laminate film of a four-layer structure. The four-layer structure is formed by sequentially laminating a first dielectric thin film 17a composed of, for example, ZnS, SiO2, SiN or alloys thereof, etc. a binary or ternary chalcogen metal alloy thin film 17b including any of Ge, Sb, Se, Bi and Ti, a second dielectric thin film 17c composed of ZnS, SiO2, SiN or alloys thereof, etc. and a reflective film 17d composed of metal such as Al, Ag, Au, Cu, Ti, Ni, etc. or alloys thereof, etc.

Now, an example in which the present invention is applied to the RAM disk and an example in which the present invention is applied to the P-ROM disk will be described hereinafter.

Figure 32:
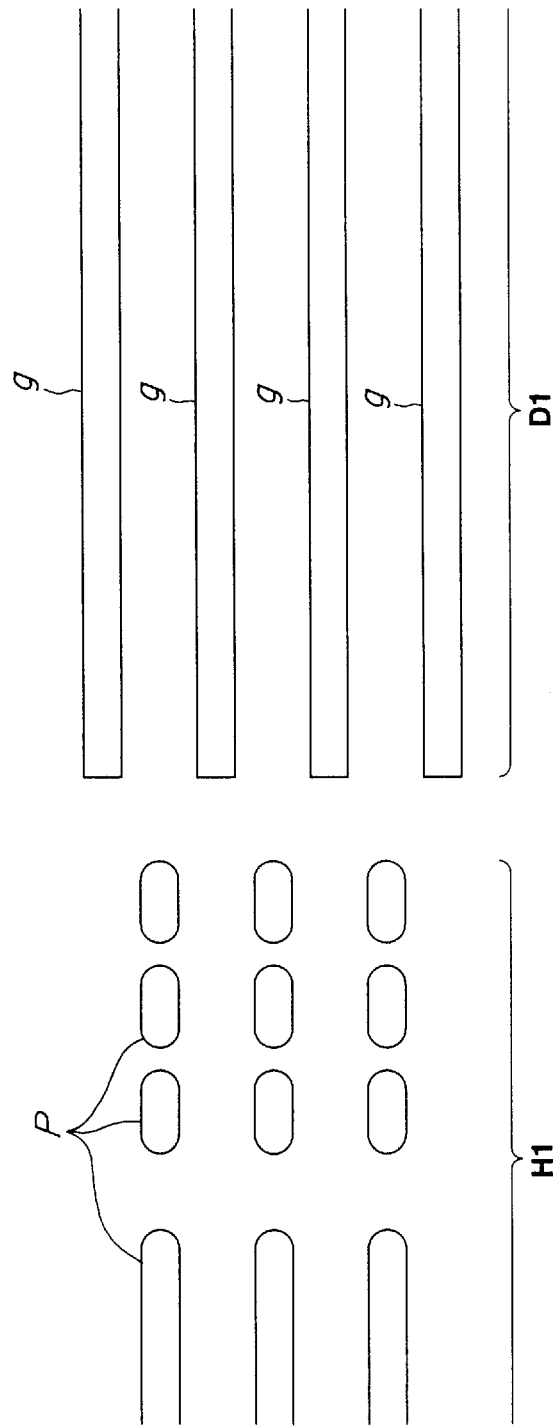
FIG. 32 is a plan view schematically showing an example of the format of a ROM disk to which the present invention is applied.

In the case of the RAM disk, the pits are not formed in a part in which information signals are to be actually written. However, a header part in which address information or the like is previously written by the pits is formed in the recording area. Thus, in a conventional RAM disk, both the grooves and the pits have been formed. Then, the grooves are removed from the header part by applying the present invention to the header part, so that both the grooves and the pits are not provided in the same track. Specifically, as illustrated in FIG. 32, the grooves g are left in a part D1 in which the information signals are actually written and the depth of the pits p is increased and the grooves are removed in the header part H1. Thus, both the grooves g and the pits p are not formed in the same track, so that the disk can be extremely easily manufactured.

Next, the P-ROM disk will be described below.

Figure 33:
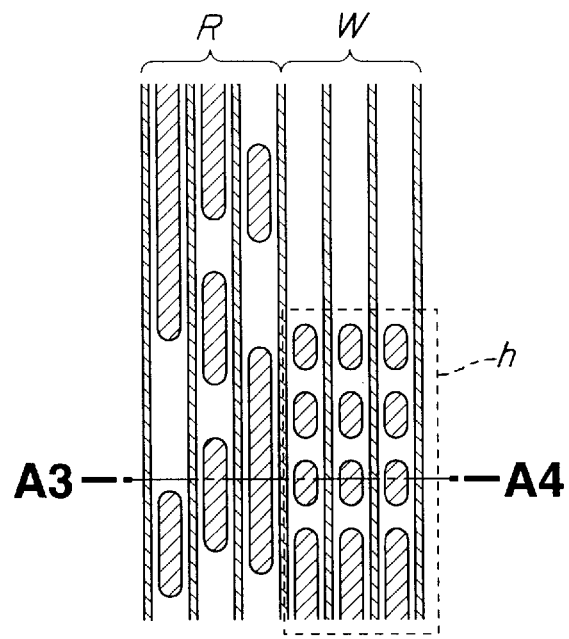
FIG. 33 is a plan view for schematically illustrating the format of a conventional P-ROM disk.
Figure 34:
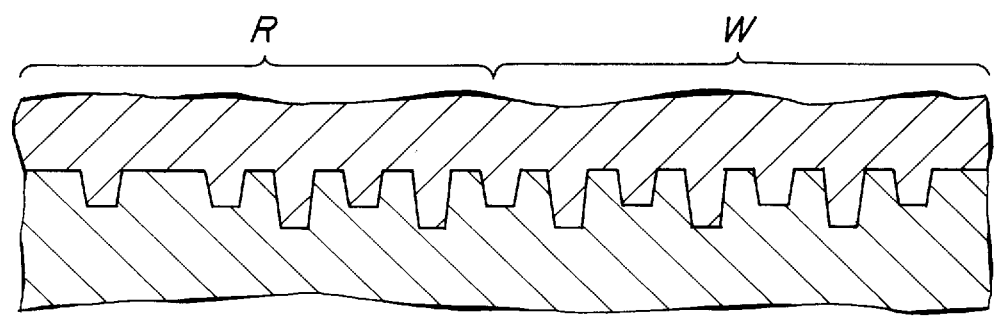
FIG. 34 is a sectional view taken along a line A3–A4 in FIG. 33.

The P-ROM disk has conventionally had the structure of an area exclusive for reproduction R the same as that of the header part h of a recording area W. Herein, FIG. 33 is a plan view for schematically illustrating the format of the area exclusive for reproduction R and the recording area W. FIG. 34 is a sectional view taken along a line A3–A4 in FIG. 33, namely, a view showing the sections of the area exclusive for reproduction R and the header part h of the recording area W.

Figure 35:
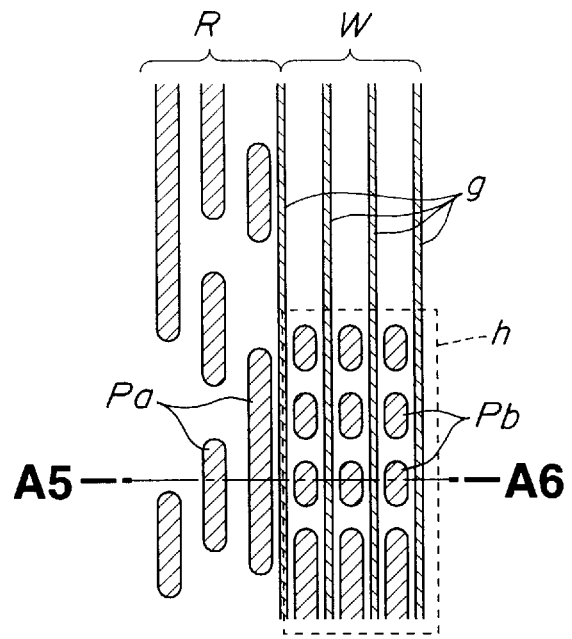
FIG. 35 is a plan view for schematically showing an example of the of a P-ROM disk to which the present invention is applied.
Figure 36:
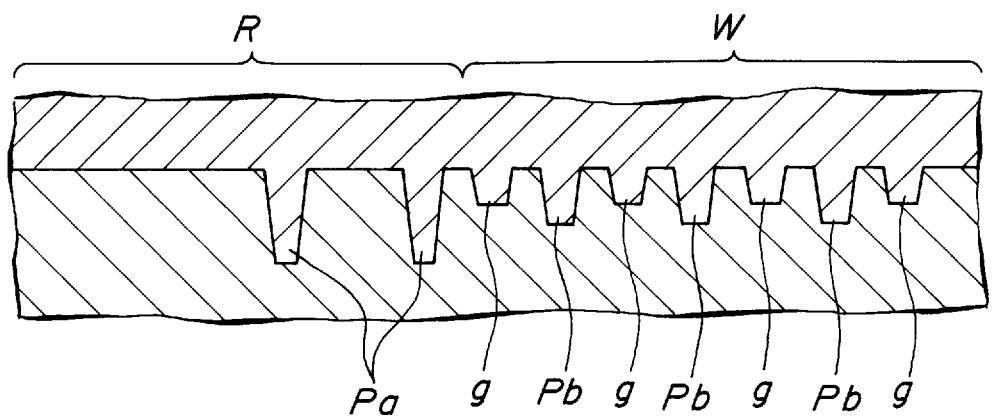
FIG. 36 is a sectional view taken along a line A5–A6 in FIG. 35.

FIG. 35 shows the format of the P-ROM disk in which the present invention is applied only to an area exclusive for reproduction. Herein, FIG. 35 is a plan view for schematically illustrating the format of the area exclusive for reproduction R and the recording area W. FIG. 36 is a sectional view taken along a line A5–A6 in FIG. 35, namely, a view illustrating the section of the area for reproduction R and the section of the header part h of the recording area W. The P-ROM disk has no groove in the area exclusive for reproduction R and especially, its base can be manufactured without difficulty. However, in such a P-ROM disk, a new problem arises when a stamper is manufactured.

The stamper of the optical disk is manufactured in accordance with a method including the steps of applying a photoresist of the thickness corresponding to the depth of the deepest recessed part (usually, a pit part) on the disk onto a glass plate, exposing the photoresist with a laser light to cut it into a desired pattern, applying an etching process to the cut pattern, depositing a metal on the obtained irregular pattern and copying the pattern. When the cutting operation is carried out, conventionally, the pit parts have been exposed with a strong laser light of high power so as to cut all the thickness of the applied photoresist and the groove parts have been exposed with a weak laser light of slightly low power, which is called a half tone. Thus, an intermediate height corresponding to the height of the groove parts have been realized. In the P-ROM disk in which the present invention is applied only to the area exclusive for reproduction R as mentioned above, the depth of pits Pa formed in the area exclusive for reproduction R, the depth of grooves g formed in the recording area W and the depth of pits Pb formed in the header part h of the recording area W are different from one another, as can be seen in FIG. 36. Therefore, in the P-ROM disk, three kinds of protruding and recessed parts or irregular parts different in their height must be formed. However, it has been difficult to control the intermediate height in manufacturing the above described stamper. The formation of the three kinds of protruding and recessed parts or irregularities different in their height has caused a productivity to be significantly lowered.

Figure 37:
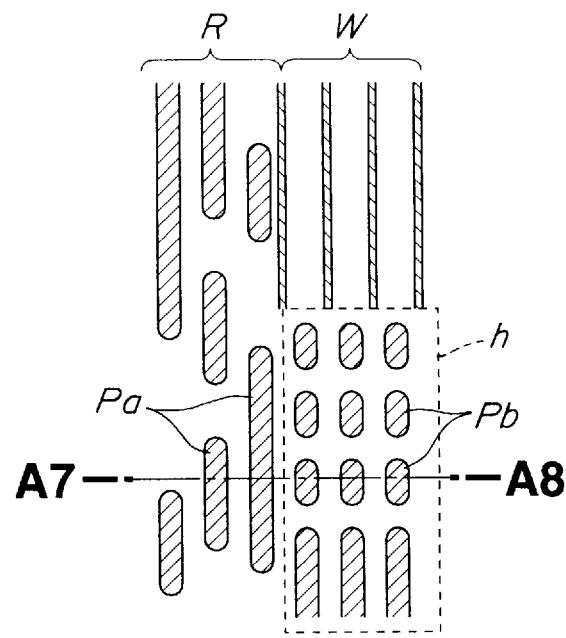
FIG. 37 is a plan view for schematically illustrating another example of the format of the P-ROM disk to which the present invention is applied.
Figure 38:
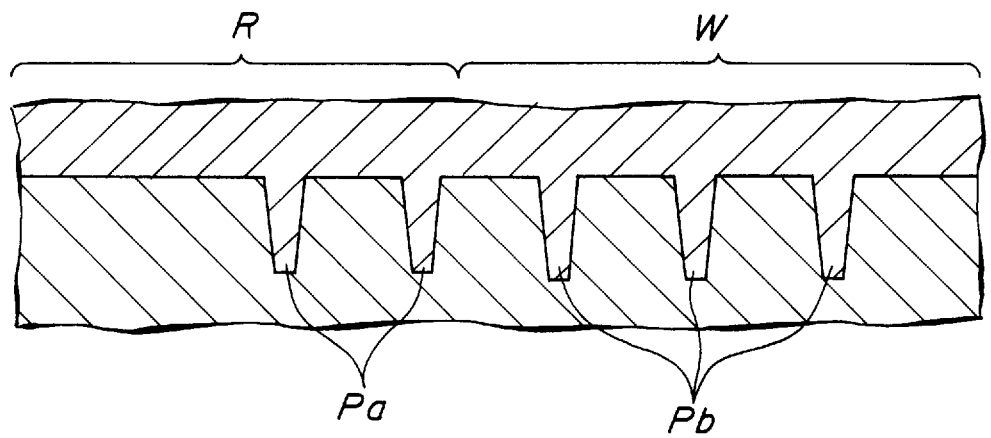
FIG. 38 is a sectional view taken along a line A7–A8 in FIG. 37.

Accordingly, when the present invention is applied to the P-ROM disk, the present invention may be preferably applied to both the header part h of the recording area W and the area exclusive for reproduction R. FIG. 37 shows the format of the P-ROM disk in which the present invention is applied to the header part h1 of the recording area W and the area R exclusive for reproduction. Herein, FIG. 37 is a plan view for schematically illustrating the format of an area exclusive for reproduction R and a recording area W. FIG. 38 is a sectional view taken along a line A7–A8 in FIG. 37, namely a view showing the section of the area exclusive for reproduction R and the header part h of the recording area W. In the P-ROM disk, the structure of the area exclusive for reproduction R is the same as that of the header part h of the recording area W. The depth of pits Pa formed in the area exclusive for reproduction R is the same as that of pits Pb formed in the header part h of the recording area W. Therefore, in the P-ROM disk, three kinds of protruding and recessed parts or irregularities different in their height do not need to be formed, so that the disk can be extremely easily manufactured.

In this connection, in order to eliminate a necessity to form the three kinds of protruding and recessed parts different in their height in the P-ROM disk in which the present invention is applied only to the area exclusive for reproduction R, a technical method may be considered in which, while the grooves g of the header part h of the recording area W are left as they are, the depth of the pits Pb in the header part h of the recording area W is increased so that the height of the pits Pb in the header part h of the recording area W is made equal to that of the pits Pa in the area exclusive for reproduction R. When the depth of the pits Pb in the header part h of the recording area W is increased, under a state in which the grooves g in the header part h of the recording area W are left as they are, the degree of difficulty in cutting is desirably lowered. However, since the depth of the pits Pb formed in the header part h of the recording area is increased, when a base is formed by an injection molding or the like, there arises an adverse effect that the grooves g formed in the header part h of the recording area W is liable to be distorted. Therefore, when the present invention is applied to the P-ROM disk, the present invention may be preferably applied, as shown in FIGS. 37 and 38, to both the area exclusive for reproduction R and the recording area W.

In the meantime, a cutting device used for exposing the photoresist when the stamper is manufactured includes a 1-beam type and a 2-beam type. The 1-beam type cutting device is used for manufacturing an optical disk which may be provided with only pits and forms a pit pattern with one laser light. On the other hand, the 2-beam type cutting device is used for manufacturing an optical disk which needs to form both pits and grooves and forms grooves and a pit pattern with two laser lights. In other words, in the 2-beam type cutting device, the pit pattern is formed with one laser light and the grooves are formed with the other laser light.

Further, the 1-beam type cutting device is preferably simpler in its structure and easier in its handling than the 2-beam type cutting device. More specifically, since the 1-beam type cutting device is provided with a smaller number of optical paths than that of the 2-beam type cutting device, it takes only a half of time as long as that required for the 2-beam type cutting device to adjust an optical axis. Further, since the 1-beam type cutting device is widely spread for manufacturing a compact disk or the like, it is desired to manufacture other optical disks by the 1-beam type cutting device.

When the present invention is applied to the optical disk exclusive for reproduction, the grooves are completely removed and only the pits are formed, so that the stamper can be produced by the 1-beam type cutting device, similarly to the optical disk exclusive for reproduction such as the compact disk. Therefore, when the present invention is applied to the optical disk exclusive for reproduction, a manufacturing cost can be greatly lowered.

Finally, a structural example of a drive device of the optical disk will be briefly described below. The optical disk according to the present invention can be employed by an ordinary drive device. It should be noted that the drive device which meets the present invention be not limited to a drive device mentioned below.

Figure 39:
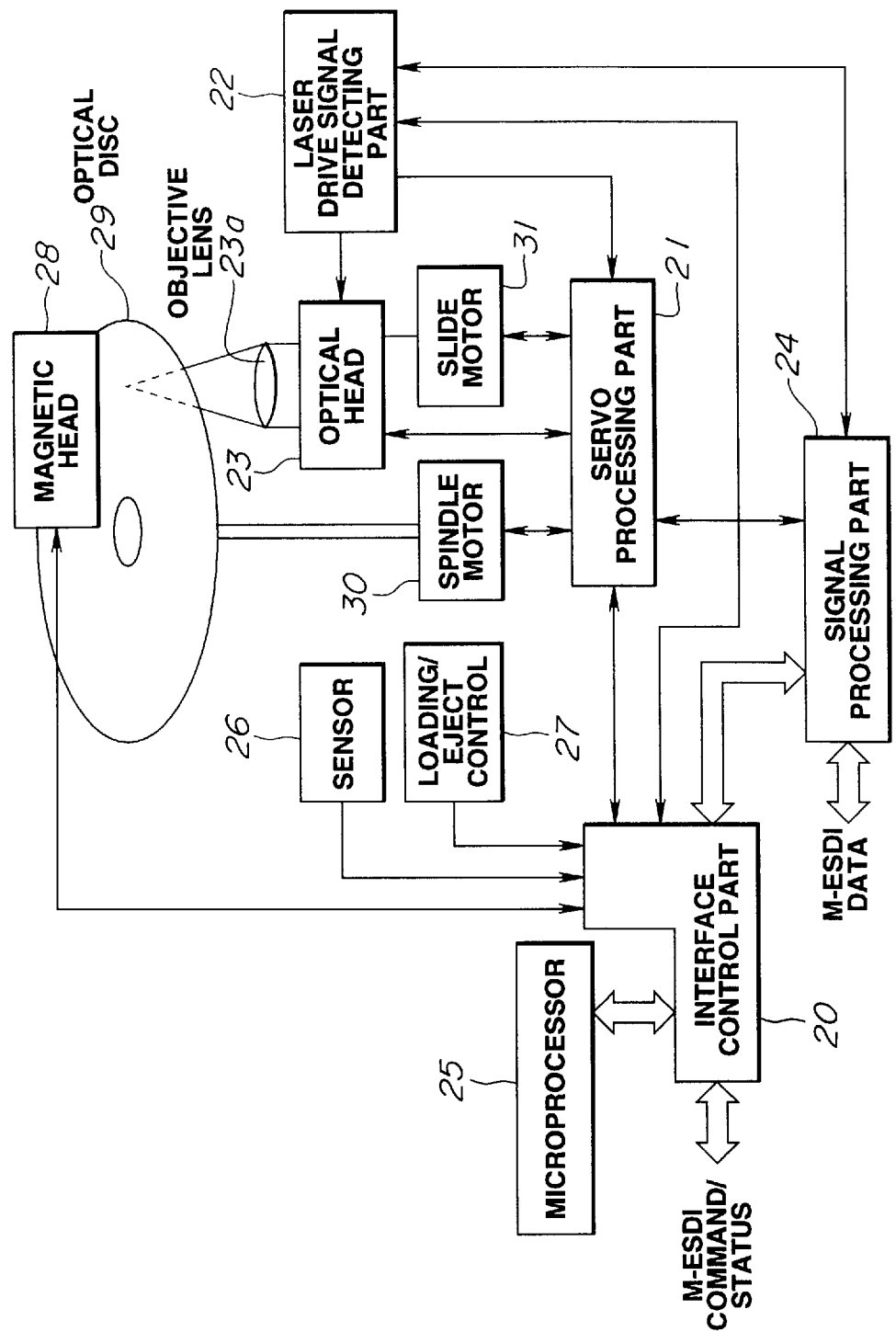
FIG. 39 is a block diagram showing a structural example of a drive device.

FIG. 39 shows the schematic structure of the drive device. As shown in FIG. 39, the drive device comprises an interface control part 20 for controlling an interface with an external circuit, a servo processing part 21 for carrying out a servo processing, an optical head 23 for emitting a laser beam or light based on a laser drive signal supplied from the interface control part 20 through a laser drive signal detecting part 22 and a signal processing part 24 for performing signal processings such as an address detection or a modulation/demodulation or the like.

The above mentioned interface control part 20 operates based on a signal from a microprocessor 25 and receives signals form various kinds of sensors 26 and a signal from a loading/eject control part 27 or the like. This interface control part 20 is connected to a magnetic head 28 for applying a bias magnetic field to the disk having information signals during recording of the information signals to control the operation of the magnetic head 28. Further, the interface control part 20 is connected to a below described drive controller so that it supplies to and receives from the drive controller an M-ESDI command/ status. Still further, the interface control part 20 is connected to the servo processing part 21 so that it supplies to and receives from the servo processing part 21 signals related to the servo processing.

The servo processing part 21 controls the movement of a spindle motor 30 for rotating an optical disk 29, the movement of the optical head 23 provided with an objective lens 23a, the movement of a slide motor 31 to which the optical head 23 is attached or the like based on signals from the interface control part 20 or the like. Namely, the servo processing part 21 performs a tracking control or a focusing control by controlling, for example, the movement of the optical head 23, and the amount of movement of the optical head 23 by controlling the movement of the spindle motor 30 and the rotation of the optical disk 29 by controlling the movement of the spindle motor 30.

The signal processing part 24 carries out the signal processing such as the detection of addresses or the modulation/demodulation or the like of signals detected by the optical head 23. This signal processing part 24 is connected to the drive controller so that it supplies to and receives from the drive controller M-ESDI data.

Figure 40:
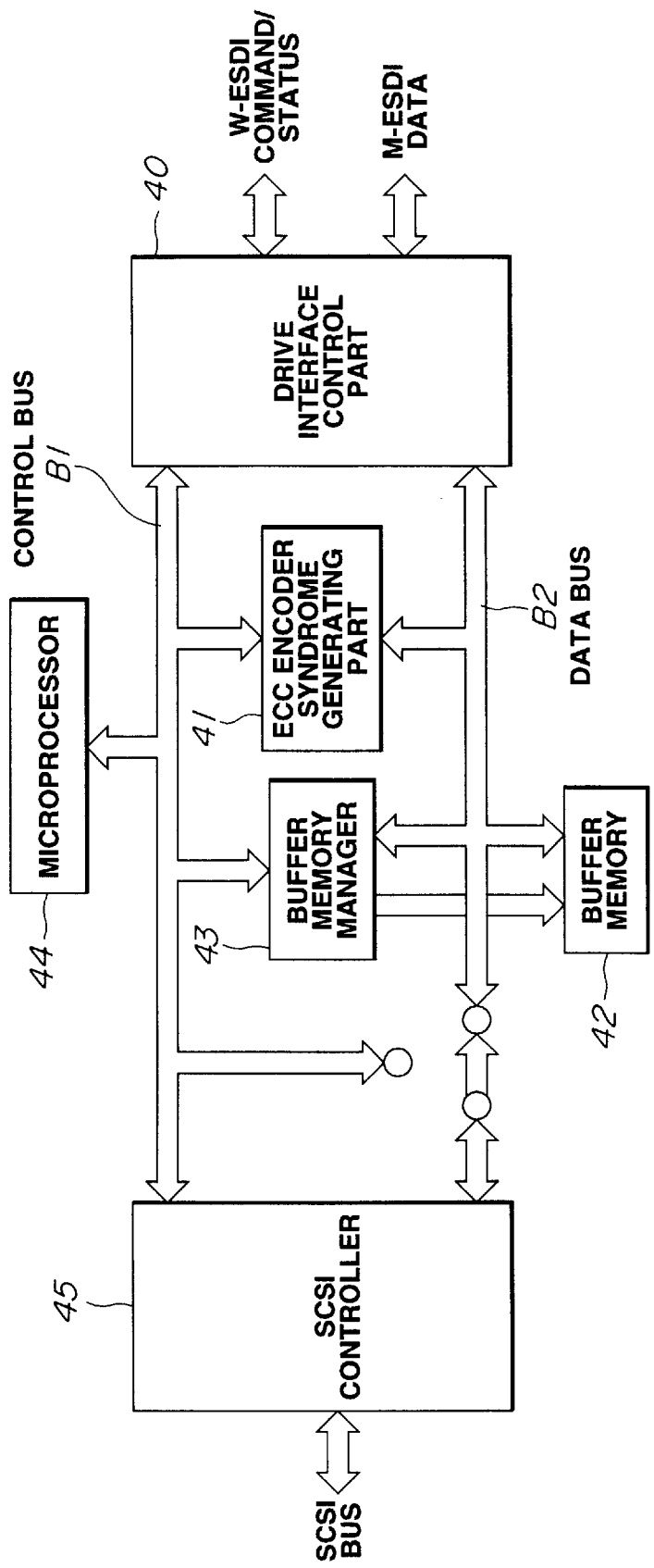
FIG. 40 is a block diagram illustrating a structural example of a drive controller.

The drive controller of the drive device is provided with, as illustrated in FIG. 40, a drive interface control part 40 for controlling an interface with the drive device, an ECC encoder syndrome generating part 41 for generating an ECC encoder syndrome, a buffer memory 42, a buffer memory manager 43 for controlling the buffer memory 42, a microprocessor 44 for performing various kinds of computing processings and an SCSI controller 45 for controlling the interface with the external circuit. The above described members are interconnected through a control bus B1 which is a bus for control signals or a data bus B2 which is a bus for data. This drive controller is connected to the above mentioned drive device through the drive interface control part 40. Namely, the drive controller supplies to and receives from the interface control part 20 the M-ESDI command/ status through the drive interface control part 40, and supplies to and receives from the signal processing part 24 the M-ESDI data. The drive controller is connected to the external circuit through the SCSI controller 45. Specifically, the drive device supplies to and receives from the external circuit signals by a SCSI bus through the SCSI controller 45.

As apparent from the above description, the optical recording medium according to the present invention can be reproduced by a conventional drive device which meets an optical disk having grooves formed thereon, even when the optical recording medium of the invention has no groove on an area exclusive for reproduction in which pits are formed. That is, according to the present invention, an optical recording medium of the type, can be provided, that the grooves are not formed in the area in which the pits are formed, a productivity is excellent and a compatibility, is provided, with the conventional drive device which meets an optical disk having grooves formed thereon.

Particularly, the present invention is applied to the optical disk exclusive for reproduction having no recording area, the stamper can be manufactured by the 1-beam type cutting device, similarly to the optical disk exclusive for reproduction such as a compact disk. Therefore, the optical disk exclusive for reproduction to which the present invention is applied can be manufactured by employing a manufacturing device for a compact disk or the like. Thus, a manufacturing cost can be greatly reduced.

What is claimed is:

1. An optical recording medium comprising:
    a base on which pits encompass information signals formed in the shapes of protruding and recessed parts, and grooves have been removed which were located between sequences of said pits, wherein, when the refractive index of the base of the optical recording medium is n and the wavelength of light used for reproduction is $\lambda$, the depth of the pits is located within a range of $\lambda/(4n)$ to $\lambda/(2n)$, the width of the pits is located within a range of 0.3 to 0.6 $\mu$m and the wavelength $\lambda$ of the light is not longer than 795 nm.

2. An optical recording medium according to claim 1, wherein the depth of the pits is located within a range of 170 to 220 nm, and the wavelength $\lambda$ of the light is located within a range of 770 to 795 nm.

3. An optical recording medium comprising:
    a base on which pits showing information signals formed in the shapes of protruding and recessed parts, wherein, when it is assumed that the refractive index of the base of the optical recording medium is n and the wavelength of light used for reproduction is $\lambda$, the depth of the pits is located within a range of $\lambda/(4n)$ to $\lambda/(2n)$, the width of the pits is located within a range of 0.3 to 0.6 $\mu$m and the wavelength $\lambda$ of the light is not longer than 795 nm, wherein if wavelength $\lambda$ of light used for reproduction is 780 nm, the push-pull signal pp and the cross talk signal CTS based on the quantity of return light from the land are:
    when the polarizing direction of a laser light is parallel to a track,
    $0.35 \leq$ a push-pull signal $\leq 0.90$
    $0.12 \leq$ a cross track-signal CTS $\leq 0.60$; and
    when the polarizing direction of a laser light is perpendicular to a track,
    $0.22 \leq$ a push-pull signal $\leq 0.70$
    $0.20 \leq$ a cross track-signal CTS $\leq 0.75$.

4. An optical recording medium according to claim 1, wherein the depth of the pits is located within a range of 160 to 200 nm and the wavelength $\lambda$ of the light is located within a range of 675 to 695 nm.

5. An optical recording medium comprising:
    a base on which pits showing information signals formed in the shapes of protruding and recessed parts, wherein, when it is assumed that the refractive index of the base of the optical recording medium is n and the wavelength of light used for reproduction is $\lambda$, the depth of the pits is located within a range of $\lambda/(4n)$ to $\lambda/(2n)$, the width of the pits is located within a range of 0.3 to 0.6 $\mu$m and the wavelength $\lambda$ of the light is not longer than 795 nm, wherein if wavelength $\lambda$ of light used for reproduction is 680 nm, the push-pull signal pp and the cross talk signal CTS based on the quantity of return light from the land are:
    when the polarizing direction of a laser light is parallel to a track,
    $0.20 \leq$ a push-pull signal $\leq 0.60$
    $0.45 \leq$ a cross track-signal CTS $\leq 0.90$; and
    when the polarizing direction of a laser light is perpendicular to a track,
    $0.20 \leq$ a push-pull signal $\leq 0.60$
    $0.30 \leq$ a cross track-signal CTS $\leq 0.75$.

6. An optical recording medium according to claim 1, wherein the depth of the pits is located within a range of 170 to 200 nm and the wavelength $\lambda$ of the light is located within a range selected from the group of ranges consisting of 770 to 795 nm and 675 to 695 nm.

7. An optical recording medium according to claim 1, wherein the pits are formed in an area exclusive for reproduction.

8. An optical recording medium according to claim 1, wherein the pits are formed in a recording area in which the information signals are written.

9. An optical recording medium according to claim 1, wherein the pits are those formed in the area exclusive for reproduction and those formed in the recording area in which the information signals are written.

10. An optical recording medium comprising:
    a base on which pits showing information signals formed in the shapes of protruding and recessed parts, wherein, when it is assumed that the refractive index of the base of the optical recording medium is n and the wavelength of light used for reproduction is $\lambda$, the depth of the pits is located within a range from substantially less than $\lambda/(4n)$ to $\lambda/(2n)$, the width of the pits is located within a range of 0.3 to 0.6 $\lambda$m and the wavelength $\lambda$ of the light is not longer than 795 nm.

11. An optical recording medium as in claim 10, wherein the depth of the pits is located within a range of $\lambda/(3n)$ to $\lambda/(2n)$.

12. An optical recording medium as in claim 10, wherein the depth of the pits is located within a range of $3\lambda/(8n)$ to $\lambda/(2n)$.

13. An optical recording medium as in claim 1, wherein the wavelength of the light is within a range of 500 nm to 590 nm.

14. An optical recording medium as in claim 1, wherein the wavelength of the light is within a range of 670 nm to 750 nm.

15. An optical recording medium as in claim 1, wherein the wavelength of the light is within a range of 700 nm to 750 nm.

* * * * *